United States Patent
Watanabe

(10) Patent No.: US 8,520,098 B2
(45) Date of Patent: Aug. 27, 2013

(54) IMAGE PICKUP APPARATUS AND REPRODUCING APPARATUS

(75) Inventor: Yoshinori Watanabe, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 11/610,740

(22) Filed: Dec. 14, 2006

(65) Prior Publication Data

US 2007/0139536 A1    Jun. 21, 2007

(30) Foreign Application Priority Data

Dec. 16, 2005  (JP) .................................. 2005-364043
Nov. 21, 2006  (JP) .................................. 2006-314402

(51) Int. Cl.
*H04N 5/262*     (2006.01)
*H04N 5/76*      (2006.01)
*H04N 5/228*     (2006.01)

(52) U.S. Cl.
USPC .................... 348/239; 348/222.1; 348/231.99

(58) Field of Classification Search
USPC ................. 348/222.1, 231.99, 231.1–231.9, 348/239
See application file for complete search history.

(56) References Cited

U.S. PATENT DOCUMENTS

| | | | |
|---|---|---|---|
| 5,166,721 A * | 11/1992 | Akasaka ...................... 396/104 |
| 5,987,179 A | 11/1999 | Riek et al. | |
| 6,115,341 A | 9/2000 | Hirai | |
| 6,539,169 B1 | 3/2003 | Tsubaki et al. | |
| 6,549,307 B1 | 4/2003 | Makishima et al. | |
| 6,876,393 B1 * | 4/2005 | Yokonuma ..................... 348/372 |
| 6,956,971 B1 | 10/2005 | Cho et al. | |
| 2001/0048472 A1 | 12/2001 | Inoue et al. | |
| 2002/0109780 A1 * | 8/2002 | Kaku ....................... 348/231.99 |
| 2002/0140827 A1 | 10/2002 | Okisu | |
| 2002/0172505 A1 | 11/2002 | Takahashi et al. | |
| 2003/0011689 A1 * | 1/2003 | Shioji ........................ 348/231.6 |
| 2003/0071904 A1 * | 4/2003 | Karasaki et al. ........... 348/231.3 |
| 2003/0147640 A1 * | 8/2003 | Voss et al. ..................... 396/310 |
| 2003/0169818 A1 | 9/2003 | Obrador | |
| 2004/0090539 A1 * | 5/2004 | Kim et al. .................. 348/231.1 |
| 2004/0125218 A1 * | 7/2004 | Ohmori ...................... 348/231.3 |
| 2004/0212694 A1 * | 10/2004 | Miki .......................... 348/231.2 |
| 2004/0263630 A1 * | 12/2004 | Rokutanda ................. 348/207.1 |
| 2006/0268117 A1 * | 11/2006 | Loui et al. .................. 348/220.1 |
| 2007/0273771 A1 * | 11/2007 | Hayashi ..................... 348/222.1 |

FOREIGN PATENT DOCUMENTS

| | | |
|---|---|---|
| CN | 1198066 A | 11/1998 |
| JP | 2002-300372 A | 10/2002 |
| JP | 2003-283921 A | 10/2003 |

* cited by examiner

*Primary Examiner* — Tuan Ho
*Assistant Examiner* — Akshay Trehan
(74) *Attorney, Agent, or Firm* — Canon USA Inc. IP Division

(57) ABSTRACT

When a shooting mode is changed from a non-super-resolution mode to a super-resolution mode, an image pickup apparatus lowers a compression ratio in a compression unit. On the other hand, when the shooting mode is changed from the super-resolution mode to the non-super-resolution mode, the image pickup apparatus raises a compression ratio in the compression unit.

8 Claims, 17 Drawing Sheets

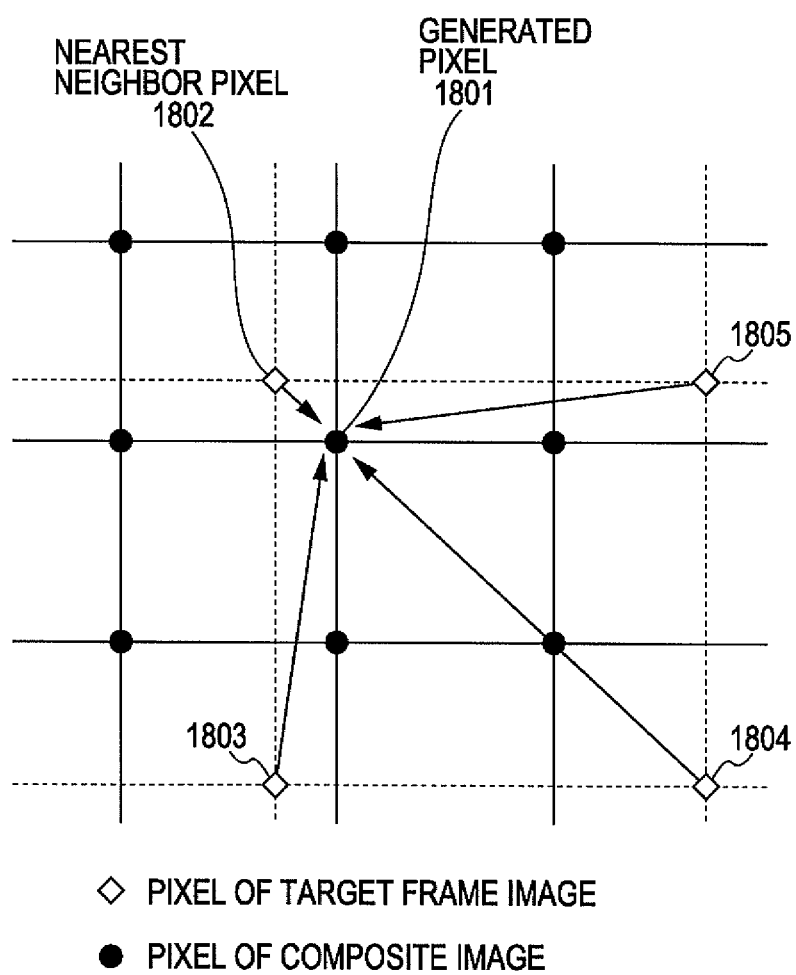

IMAGE PICKUP APPARATUS AND REPRODUCING APPARATUS

BACKGROUND OF THE INVENTION

1. Field of the Invention

The present invention relates to image pickup apparatuses and reproducing apparatuses, and particularly to techniques for changing a compression ratio during moving image shooting.

2. Description of the Related Art

Today, many commercially available cameras are configured to be capable of shooting both digital videos and digital still photographs. However, different pipelines are typically provided for a video recording mode and a digital still image mode. Therefore, a user is required to switch back and forth between the video recording mode and the digital still image mode during shooting. Moreover, even if a frame is extracted from a moving image to obtain a digital still image, the resolution of the frame image taken by using the pipeline for the video recording mode is low.

Japanese Patent Laid-Open No. 2003-283921 (hereinafter referred to as "Patent Document 1") discloses a method for simultaneously processing digital video frames and high-resolution still images in a burst mode. This method allows snapshots to be taken during moving image shooting.

Japanese Patent Laid-Open No. 2002-300372 (hereinafter referred to as "Patent Document 2") discloses a technique (super-resolution processing) for combining two images serially taken, thereby achieving high-quality images or images with advanced visual effects.

However, the processing method described in Patent Document 1 is directed specifically to taking snapshots during moving image shooting. The method does not allow a user, during moving image reproduction, to extract a high-resolution frame image at a desired scene from a compressed moving image.

Also, an image processing apparatus described in Patent Document 2 has a disadvantage that if a moving image is recorded at a high compression ratio, such as in the case of a moving image in Moving Picture Experts Group (MPEG) format, the resolution of a composite image generated from a plurality of consecutive frames in a section where there are consecutive predicted frames (P-frames) is low.

SUMMARY OF THE INVENTION

The present invention is directed to solving the problems described above, and provides an image pickup apparatus capable of acquiring high-quality image data for super-resolution processing.

According to an aspect of the present invention, an image pickup apparatus includes a compression unit configured to compress a picked-up subject image to generate a compressed subject image, a shooting mode changing unit configured to change a shooting mode for shooting the subject image, a compression ratio changing unit configured to change a compression ratio in the compression unit, and a recording unit configured to record the compressed subject image in a recording medium. When the shooting mode changing unit changes the shooting mode from a non-super-resolution mode to a super-resolution mode, the compression ratio changing unit changes the compression ratio in the compression unit to a lower compression ratio. When the shooting mode changing unit changes the shooting mode from the super-resolution mode to the non-super-resolution mode, the compression ratio changing unit changes the compression ratio in the compression unit to a higher compression ratio.

The present invention also provides a reproducing apparatus capable of reproducing high-quality image data for super-resolution processing.

According to another aspect of the present invention, a reproducing apparatus includes a decompression unit configured to decompress a compressed subject image recorded in a recording medium to generate a decompressed subject image, a header determination unit configured to read compression ratio information attached to the compressed subject image and to determine from the compression ratio information whether a super-resolution image can be generated, and a super-resolution-image generating unit configured to generate a super-resolution image from a plurality of consecutive subject images. The super-resolution-image generating unit generates a super-resolution image when a frame image is selected at a scene suitable for generating the super-resolution image on the basis of the determination of the header determination unit.

Further features of the present invention will become apparent from the following description of exemplary embodiments with reference to the attached drawings.

BRIEF DESCRIPTION OF THE DRAWINGS

FIG. 18 illustrates interpolation in super-resolution processing.

DESCRIPTION OF THE EMBODIMENTS

Exemplary embodiments of the present invention will be described with reference to the drawings.

First Exemplary Embodiment

Figure 1:
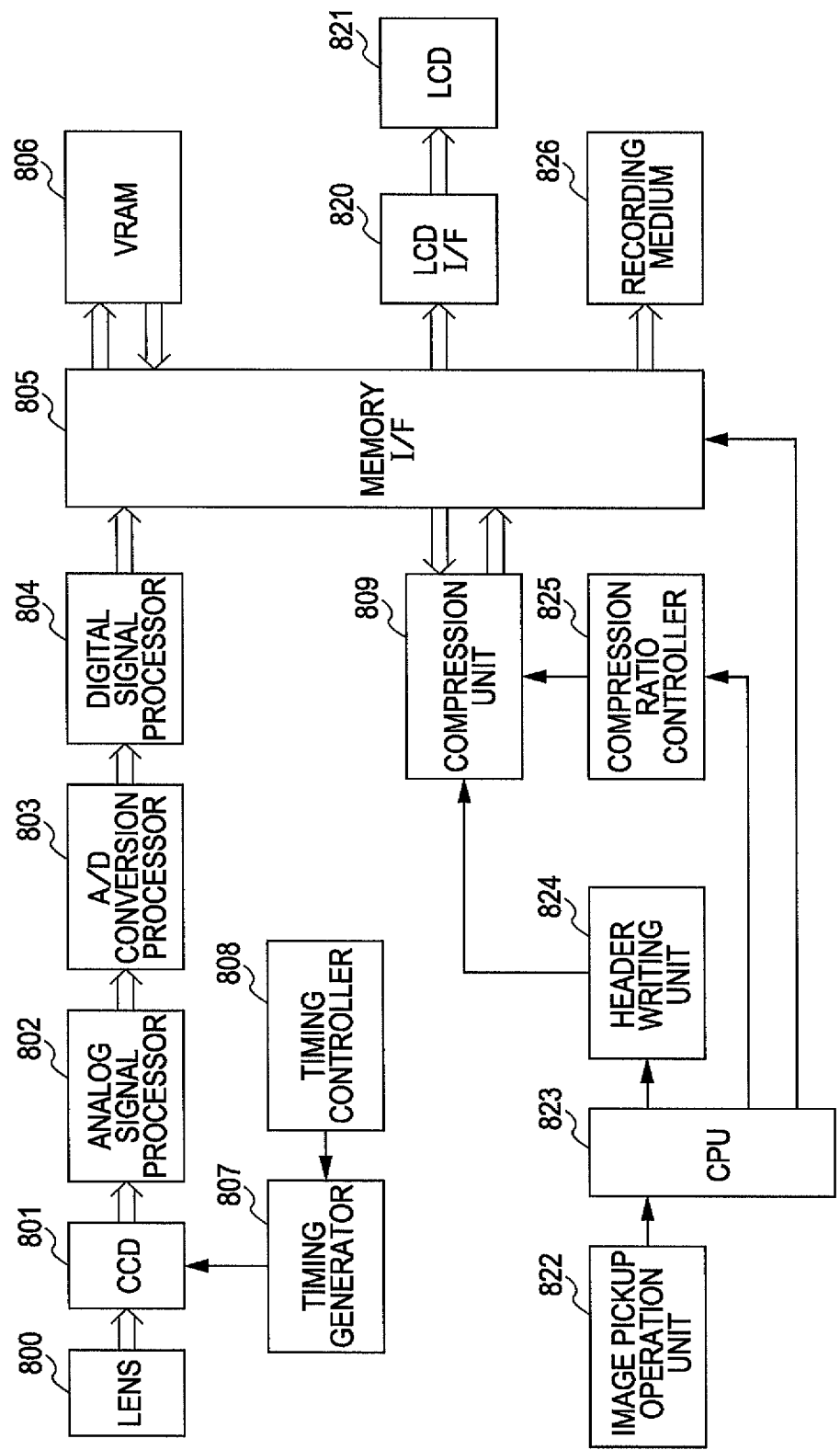
FIG. 1 is a block diagram illustrating a configuration of an image pickup apparatus according to a first exemplary embodiment of the present invention.
Figure 5:
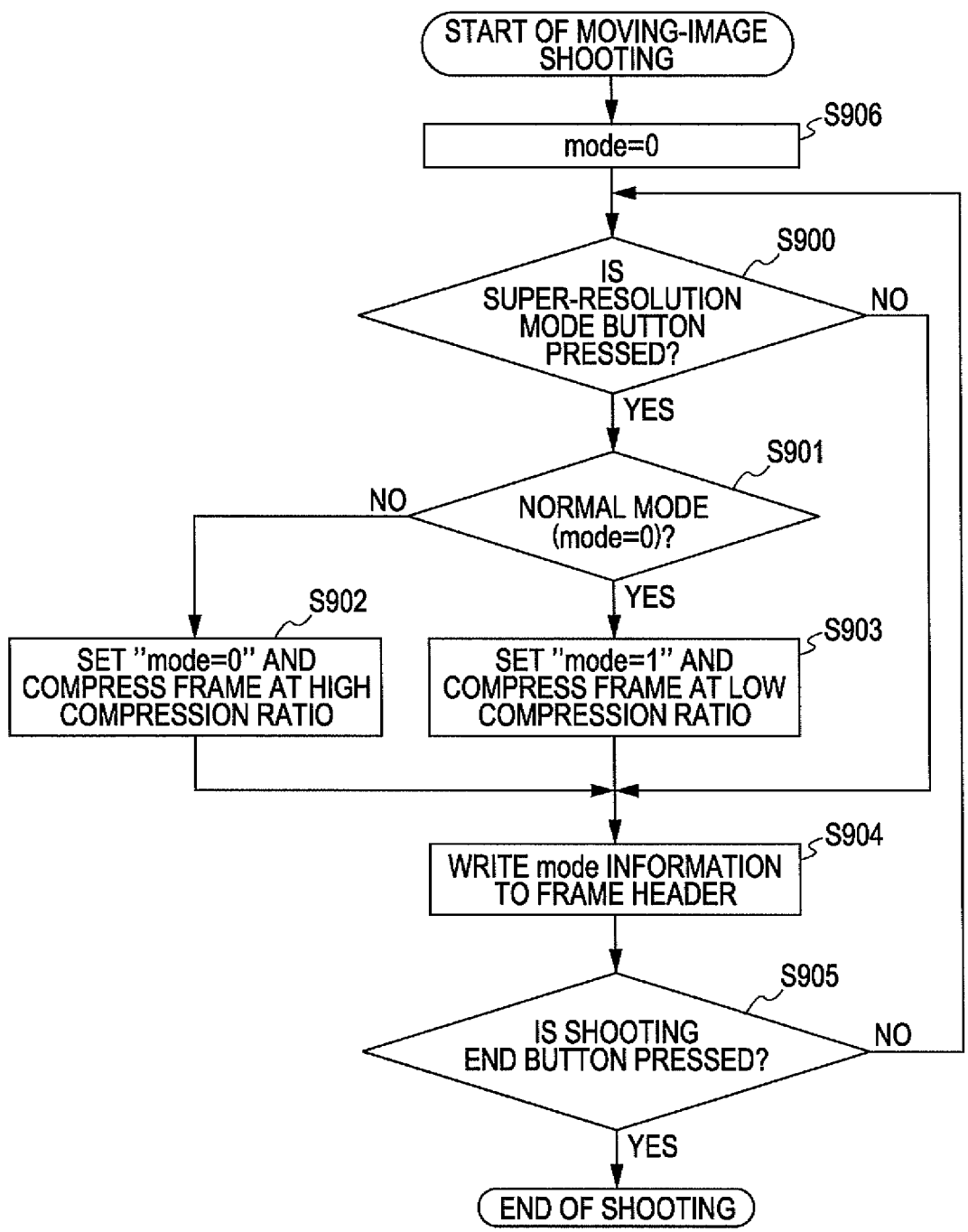
FIG. 5 is a flowchart illustrating processing steps in a central processing unit (CPU) of the image pickup apparatus according to the first exemplary embodiment of the present invention.

FIG. 1 is a block diagram according to a first exemplary embodiment of the present invention, and illustrates an exemplary configuration of an image pickup apparatus capable of changing a compression ratio during moving image shooting. FIG. 5 is a flowchart illustrating processing steps where a shooting mode is changed during moving image shooting in the first exemplary embodiment.

First, the image pickup apparatus of the present exemplary embodiment will be described with reference to FIG. 1. In FIG. 1, a subject optical image entered through a lens 800 is photoelectrically converted by a charge-coupled device (CCD) 801 into an electric signal. On the basis of a drive control signal input from a timing generator 807, the CCD 801 captures the subject optical image for a predetermined period of time.

At the same time, the CCD 801 sends an image signal having been converted into an electric signal to an analog signal processor 802 according to a read control signal (horizontal synchronizing signal, vertical synchronizing signal, or the like) input from the timing generator 807.

The timing generator 807 generates a drive control signal and a read control signal on the basis of a control signal input from a timing controller 808. The analog signal processor 802 primarily includes a low-pass filter (LPF) circuit and an automatic gain control (AGC) circuit. The analog signal processor 802 performs noise reduction and signal level adjustment on the image signal output from the CCD 801.

An analog-to-digital (A/D) conversion processor 803 converts the image signal output from the analog signal processor 802 to a digital signal (hereinafter referred to as "image data"). A digital signal processor 804 primarily includes a white balance (WB) circuit and a gamma (γ) correction circuit. The WB circuit converts the level of each color component of the image data output from the A/D conversion processor 803 and adjusts the white balance of the captured image. The γ-correction circuit uses a preset correction table to adjust the level of each pixel data and corrects the γ-characteristics of the image data.

The image data output from the digital signal processor 804 passes through a memory interface (I/F) 805 and is temporarily stored in a video random-access memory (VRAM) 806. A compression unit 809 reads the image data stored in the VRAM 806 and compresses the read image data in Motion Joint Photographic Experts Group (Motion-JPEG) format, audio video interleaving (AVI) format, or the like. The compressed image data passes through the memory I/F 805 and is recorded in a recording medium 826.

An image pickup operation unit 822 includes a moving-image-shooting start button for starting moving-image shooting operation, a moving-image-shooting end button for ending moving-image shooting operation, and a super-resolution mode button. When the super-resolution mode button is pressed, a control signal is input through a CPU 823 to a header writing unit 824 and to a compression ratio controller 825.

On the basis of the control signal from the CPU 823, the header writing unit 824 writes, to a header of each frame, information about whether shooting is to be performed in a super-resolution mode or in a normal mode (non-super-resolution mode). At the same time, on the basis of the control signal from the CPU 823, the compression ratio controller 825 outputs a control signal for controlling a compression ratio to the compression unit 809. The compression unit 809 changes the compression ratio according to the control signal input from the compression ratio controller 825. The image pickup apparatus illustrated in FIG. 1 further includes a liquid crystal display (LCD) I/F 820 and an LCD 821.

Next, processing steps performed during moving image shooting in the image pickup apparatus of the present exemplary embodiment will be described with reference to the flowchart of FIG. 5. FIG. 5 illustrates processing steps from the point at which the moving-image-shooting start button of the image pickup operation unit 822 in FIG. 1 is pressed.

Referring to FIG. 5, at the start of moving-image shooting operation, "mode" is reset to 0 in step S906. Then, the process proceeds to step S900 where it is determined whether the super-resolution mode button has been pressed in the image pickup operation unit 822. If it is determined that the super-resolution mode button has not been pressed, the process proceeds to step S904.

On the other hand, if it is determined in step S900 that the super-resolution mode button has been pressed, the process proceeds to step S901 where it is determined whether the current shooting mode is the normal mode. In the present exemplary embodiment, mode=0 is set for the normal mode and mode=1 is set for the super-resolution mode.

If it is determined in step S901 that the current shooting mode is the normal mode (i.e., mode=0), the process proceeds to step S903 where 1 is substituted into "mode". This changes the compression ratio such that frame image data is compressed at a low compression ratio.

On the other hand, if it is determined in step S901 that the current shooting mode is the super-resolution mode (i.e., mode=1), the process proceeds to step S902 where 0 is substituted into "mode". This changes the compression ratio such that frame image data is compressed at a high compression ratio.

Next, the process proceeds to step S904 where "mode" is written to the header of each frame. For example, shooting mode information, such as mode=0 for the normal mode or mode=1 for the super-resolution mode, is written.

Then, the process proceeds to step S905 where it is determined whether the moving-image-shooting end button has been pressed in the image pickup operation unit 822. If it is determined that the moving-image-shooting end button has not been pressed, the process returns to step S900 to repeat the steps described above. If it is determined in step S905 that the moving-image-shooting end button has been pressed, the shooting operation ends.

Thus, the compression ratio of the frame image can be changed by pressing the super-resolution mode button during moving image shooting. In the normal mode where the compression ratio is high, the data size of the frame image can be reduced. On the other hand, in the super-resolution mode where the compression ratio is low, the moving image can be recorded without significant loss of information for each frame.

Moreover, since shooting mode information is written to the header of each frame, a scene taken in the normal mode and a scene taken in the super-resolution mode are easily distinguishable from each other in moving image reproduction.

While the foregoing description refers to the case in which image data is compressed in Motion-JPEG format or AVI format, the image data can also be compressed in MPEG format. It is possible in the latter case to change the compression ratio of the image data during moving image shooting.

For example, for moving image recording in MPEG format, in the normal mode, in step S903 of FIG. 5, the compression ratio is changed such that frame image data is compressed at a high compression ratio in intra frames (I-frames), P-frames, and bi-directional frames (B-frames). I-frames are compressed frames generated by intraframe coding, while P-frames and B-frames are compressed frames generated by interframe coding. On the other hand, in the super-resolution mode, in step S902 of FIG. 5, the compression ratio is changed such that frame image data is compressed at a low compression ratio in I-frames, P-frames, and B-frames.

As described above, in moving image recording in MPEG format, the compression ratio of the frame image can be changed by pressing the super-resolution mode button during moving image shooting. In the normal mode where the compression ratio for I-frames, P-frames, and B-frames is high, the data size of the frame image can be reduced. On the other hand, in the super-resolution mode where the compression ratio for I-frames, P-frames, and B-frames is low, the moving image can be recorded without significant loss of information for each frame. Moreover, since shooting mode information is written to the header of each frame, a scene taken in the normal mode and a scene taken in the super-resolution mode are easily distinguishable from each other in moving image reproduction.

Second Exemplary Embodiment

Figure 8:
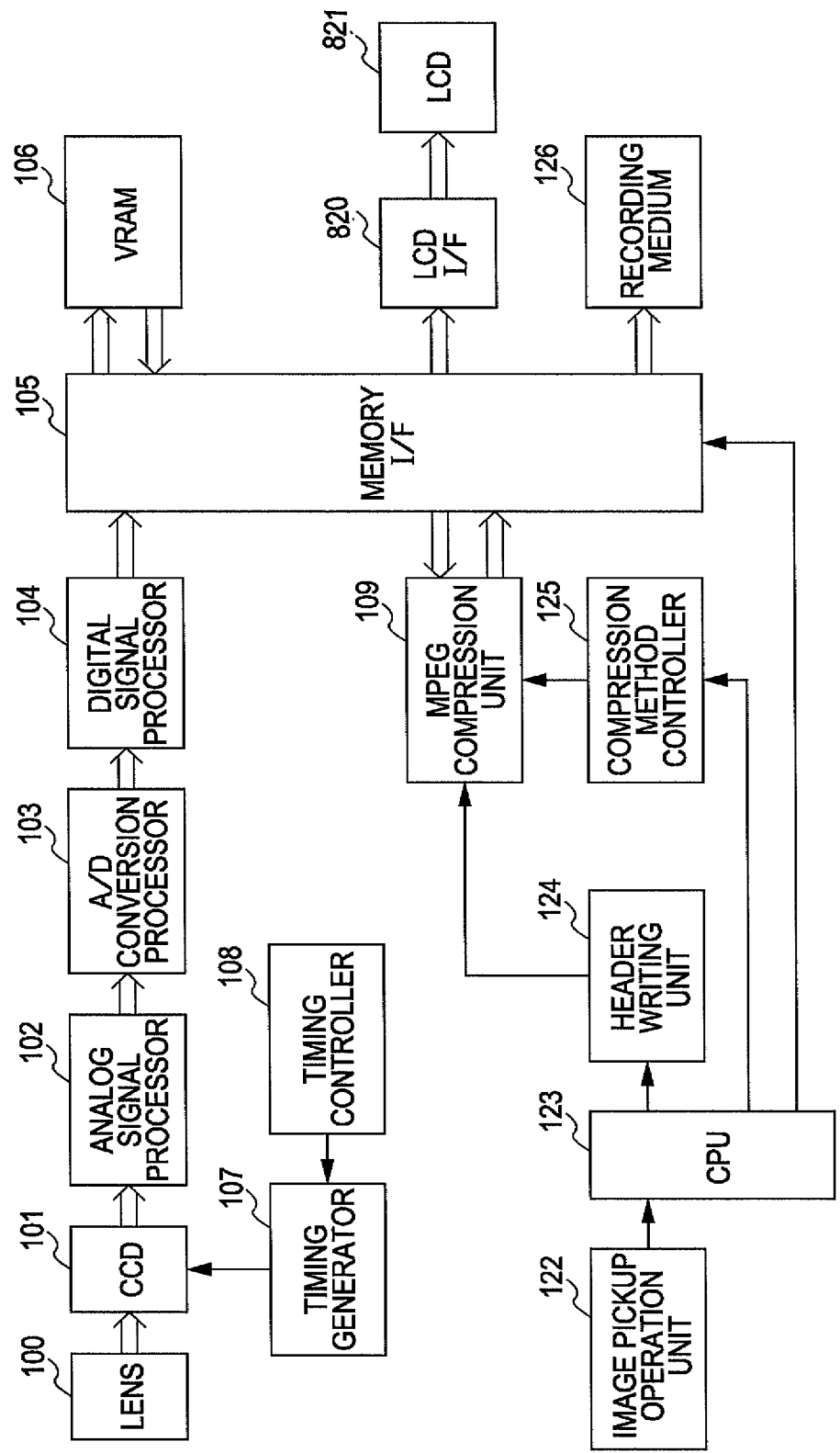
FIG. 8 is a block diagram illustrating a configuration of the image pickup apparatus according to the second exemplary embodiment of the present invention.
Figure 9:
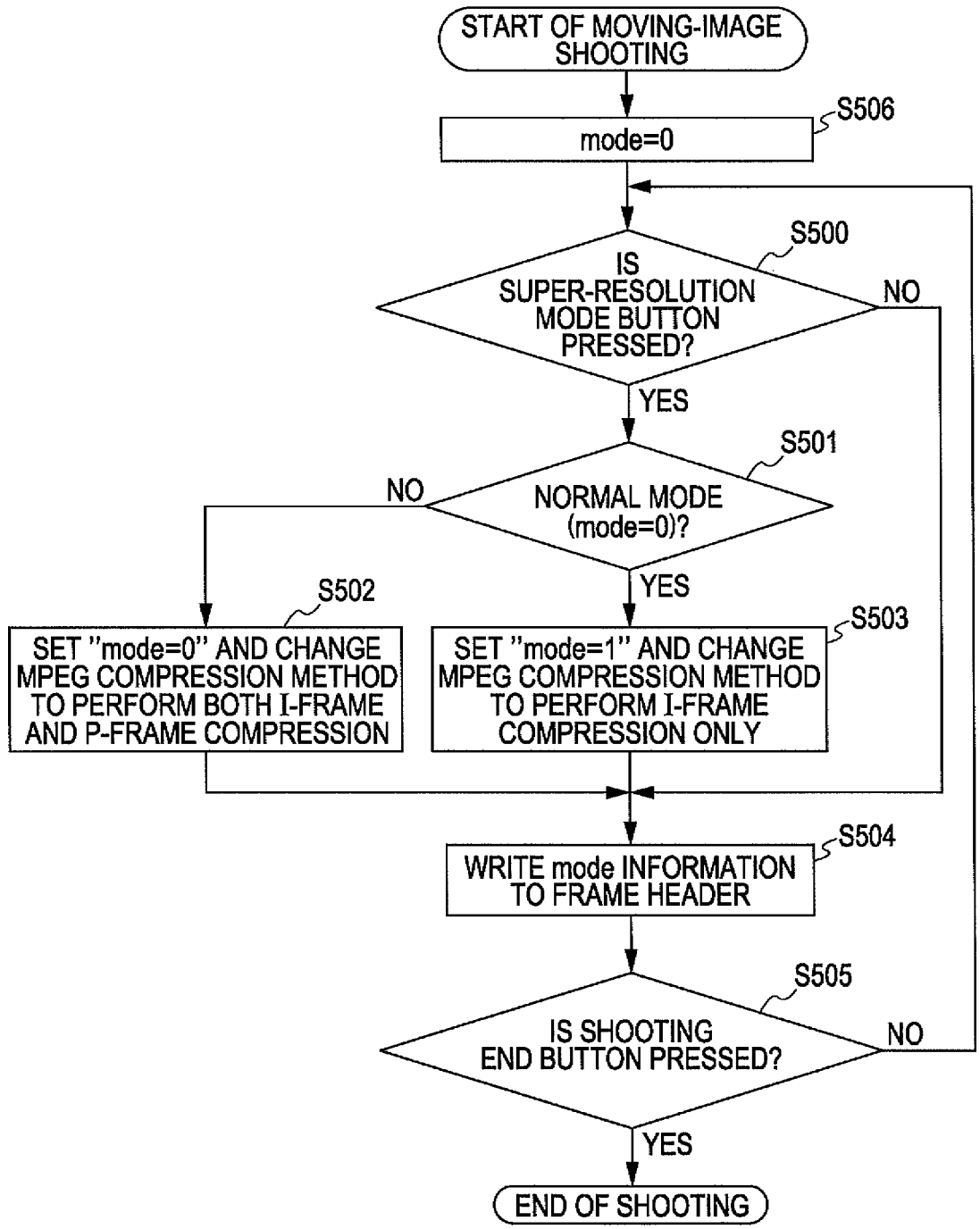
FIG. 9 is a flowchart illustrating processing steps in a CPU of the image pickup apparatus according to the second exemplary embodiment of the present invention.

FIG. 8 is a block diagram according to a second exemplary embodiment of the present invention, and illustrates an exemplary configuration of an image pickup apparatus capable of changing a compression method during moving image shooting. FIG. 9 is a flowchart illustrating processing steps where a shooting mode is changed during moving image shooting in the second exemplary embodiment.

First, a configuration of the image pickup apparatus of the present exemplary embodiment will be described with reference to FIG. 8. In FIG. 8, a subject optical image entered through a lens 100 is photoelectrically converted by a CCD 101 into an electric signal.

On the basis of a drive control signal input from a timing generator 107, the CCD 101 captures the subject optical image for a predetermined period of time. At the same time, the CCD 101 sends an image signal having been converted into an electric signal to an analog signal processor 102 according to a read control signal (horizontal synchronizing signal, vertical synchronizing signal, or the like) input from the timing generator 107.

The timing generator 107 generates a drive control signal and a read control signal on the basis of a control signal input from a timing controller 108. The analog signal processor 102 primarily includes an LPF circuit and an AGC circuit. The analog signal processor 102 performs noise reduction and signal level adjustment on the image signal output from the CCD 101.

An A/D conversion processor 103 converts the image signal output from the analog signal processor 102 to a digital signal (hereinafter referred to as "image data"). A digital signal processor 104 primarily includes a WB circuit and a γ-correction circuit. The WB circuit converts the level of each color component of the image data output from the A/D conversion processor 103 and adjusts the white balance of the captured image.

The γ-correction circuit uses a preset correction table to adjust the level of each pixel data and corrects the γ-characteristics of the image data. The image data output from the digital signal processor 104 passes through a memory I/F 105 and is temporarily stored in a VRAM 106.

An MPEG compression unit 109 reads the image data stored in the VRAM 106 and compresses the read image data in MPEG format. The compressed image data passes through the memory I/F 105 and is recorded in a recording medium 126.

An image pickup operation unit 122 includes a moving-image-shooting start button for starting moving-image shooting operation, a moving-image-shooting end button for ending moving-image shooting operation, and a super-resolution mode button. When the super-resolution mode button is pressed, a control signal is input through a CPU 123 to a header writing unit 124 and to a compression method controller 125.

On the basis of the control signal from the CPU 123, the header writing unit 124 writes, to a header of each frame, information about whether shooting is to be performed in a super-resolution mode or in a normal mode. At the same time, on the basis of the control signal from the CPU 123, the compression method controller 125 outputs a control signal for controlling a compression method to the MPEG compression unit 109. The MPEG compression unit 109 changes the MPEG compression method according to the control signal input from the compression method controller 125.

Next, processing steps performed during moving image shooting in the image pickup apparatus of the present exemplary embodiment will be described with reference to the flowchart of FIG. 9. FIG. 9 illustrates processing steps from the point at which the moving-image-shooting start button of the image pickup operation unit 122 in FIG. 8 is pressed.

Referring to FIG. 9, at the start of moving-image shooting operation, "mode" is reset to 0 in step S506. Then, the process proceeds to step S500 where it is determined whether the super-resolution mode button has been pressed in the image pickup operation unit 122. If it is determined that the super-resolution mode button has not been pressed, the process proceeds to step S504.

On the other hand, if it is determined in step S500 that the super-resolution mode button has been pressed, the process proceeds to step S501 where it is determined whether the current shooting mode is the normal mode. In the present exemplary embodiment, mode=0 is set for the normal mode and mode=1 is set for the super-resolution mode.

If it is determined in step S501 that the current shooting mode is the normal mode (i.e., mode=0), the process proceeds to step S503 where 1 is substituted into "mode". This changes the MPEG compression method such that moving image data is compressed in I-frames only.

On the other hand, if it is determined in step S501 that the current shooting mode is the super-resolution mode (i.e., mode=1), the process proceeds to step S502 where 0 is substituted into "mode". This changes the MPEG compression method such that moving image data is compressed in I-frames and P-frames.

Figure 3:
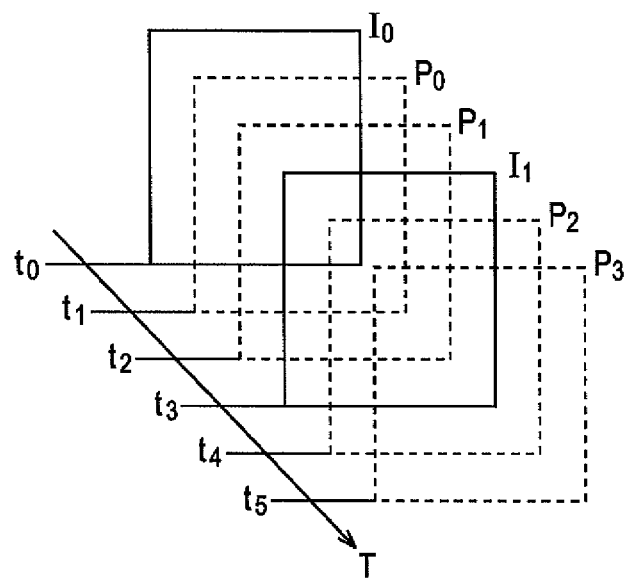
FIG. 3 is a schematic diagram illustrating a frame configuration according to a typical MPEG compression method.
Figure 4:
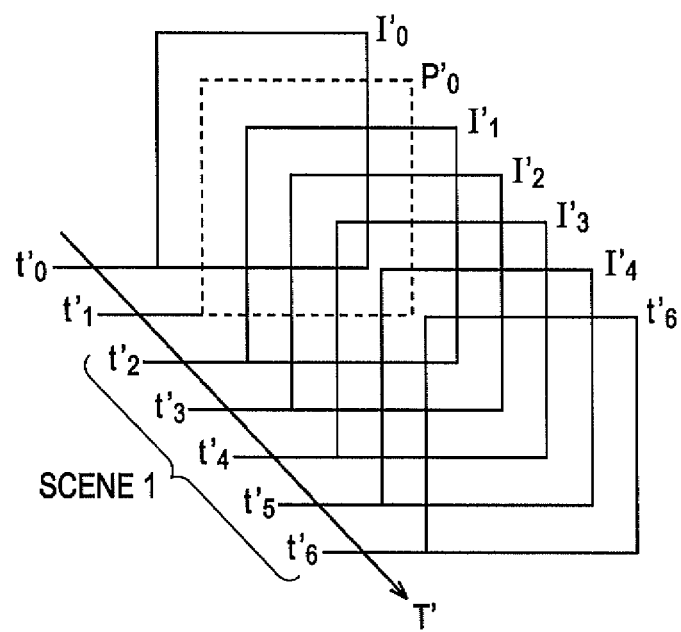
FIG. 4 is a schematic diagram illustrating a frame configuration according to an MPEG compression method changed by an image pickup apparatus of a second exemplary embodiment of the present invention.

For example, the normal mode means that image data is compressed in I-frames and P-frames, as illustrated in FIG. 3. On the other hand, as illustrated in FIG. 4, the super-resolution mode means that, from the point (e.g., time t'2 in FIG. 4) at which the shooting mode changes, image data is compressed in I-frames only.

Referring back to FIG. 9, the process proceeds to step S504 where shooting mode information, such as mode=0 for the normal mode or mode=1 for the super-resolution mode, is written to the header of each frame. Next, the process proceeds to step S505 where it is determined whether the moving-image-shooting end button has been pressed in the image pickup operation unit 122. If it is determined in step S505 that the moving-image-shooting end button has not been pressed, the process returns to step S500 to repeat the steps described above. If it is determined in step S505 that the moving-image-shooting end button has been pressed, the shooting operation ends.

By performing the processing steps described above, the MPEG compression method can be changed by pressing the super-resolution mode button during moving image shooting. In the normal mode which allows a high compression method, moving image data is compressed in I-frames and P-frames, while in the super-resolution mode which allows a low compression method, moving image data is compressed in I-frames only.

Moreover, since shooting mode information is written to the header of each frame, a scene taken in the normal mode and a scene taken in the super-resolution mode are easily distinguishable from each other in moving image reproduction.

Third Exemplary Embodiment

Figure 10:
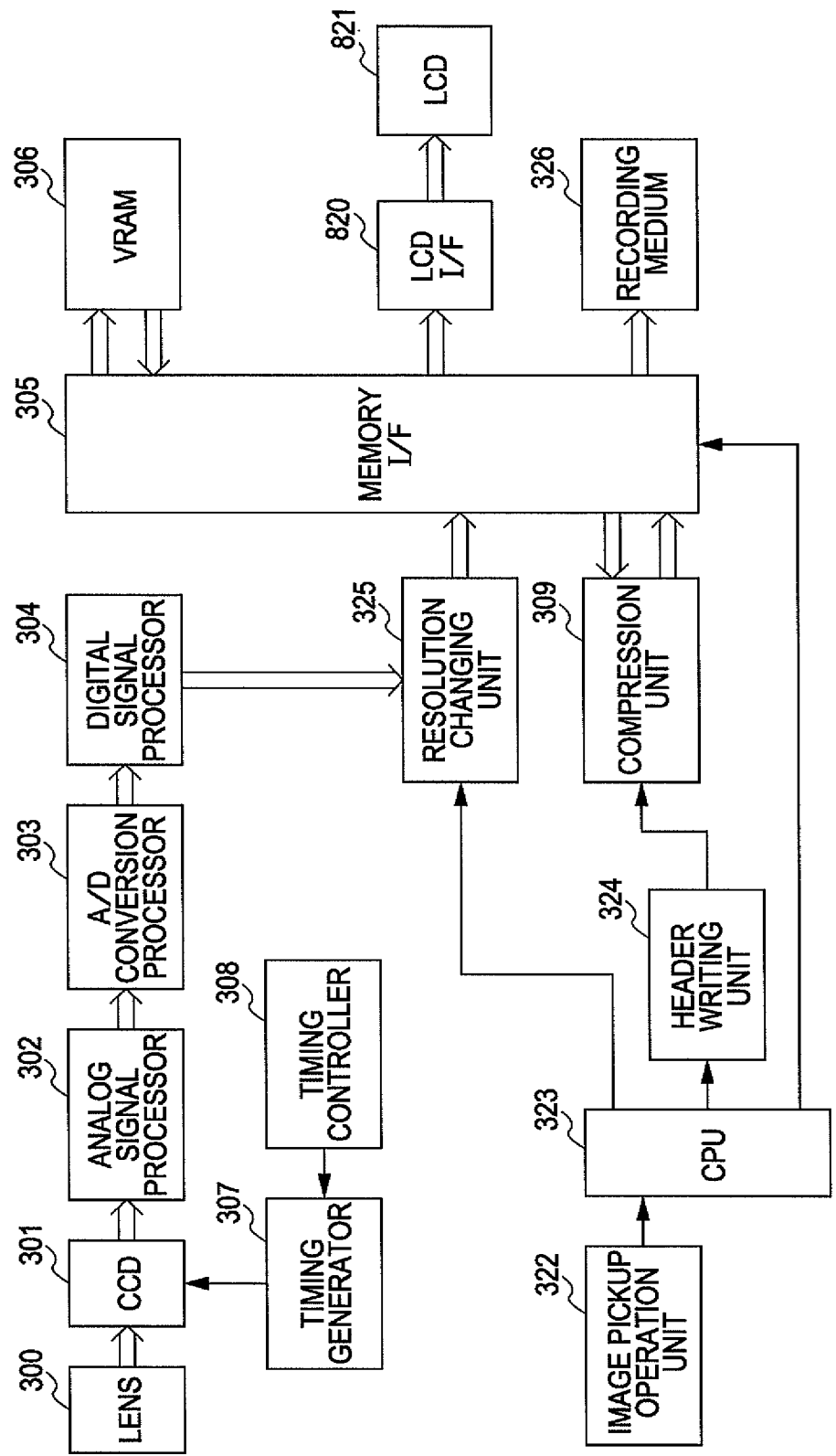
FIG. 10 is a block diagram illustrating a configuration of an image pickup apparatus according to a third exemplary embodiment of the present invention.
Figure 11:
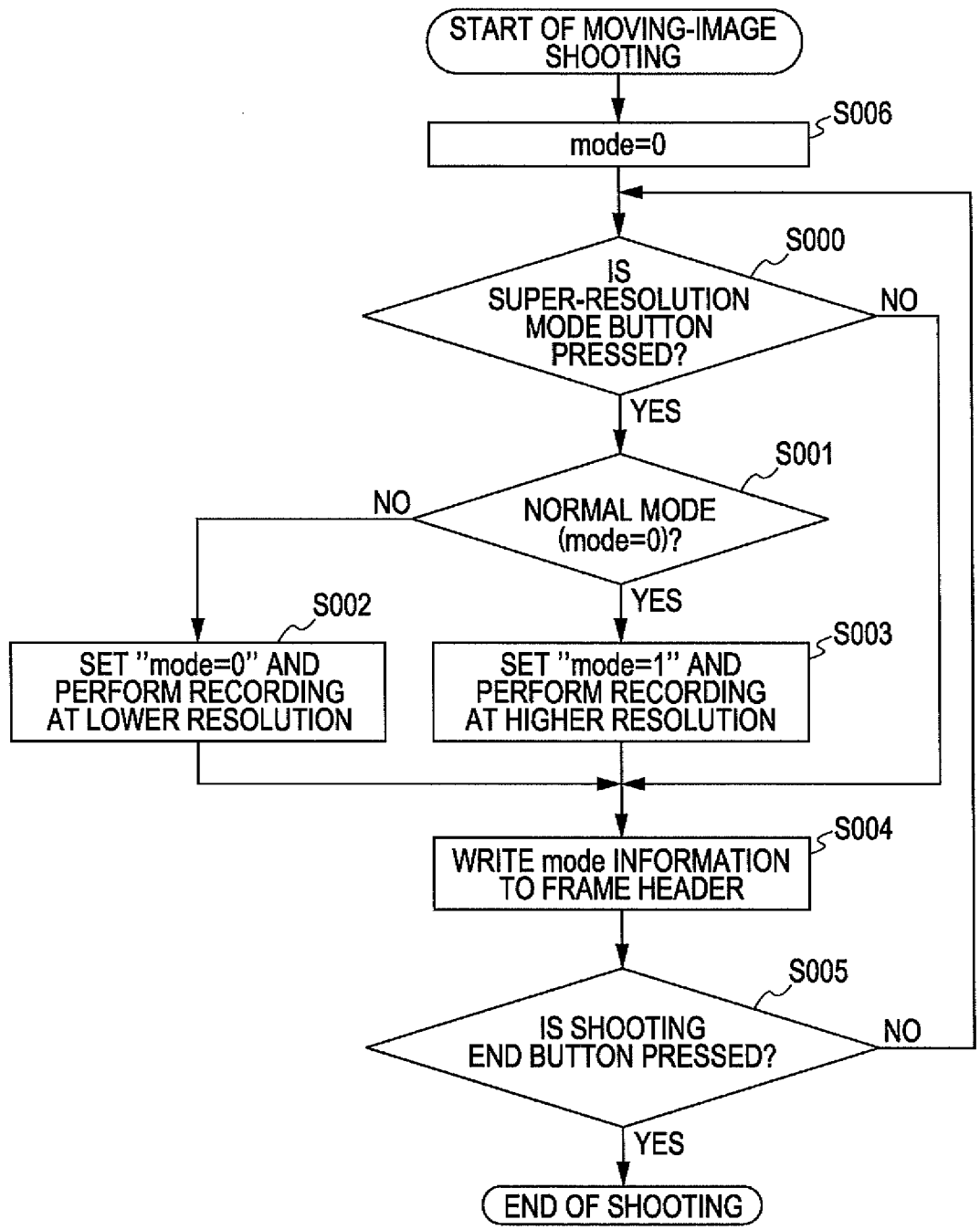
FIG. 11 is a flowchart illustrating processing steps in a CPU of the image pickup apparatus according to the third exemplary embodiment of the present invention.

FIG. 10 is a block diagram according to a third exemplary embodiment of the present invention, and illustrates an exemplary configuration of an image pickup apparatus capable of changing a frame resolution during moving image shooting. FIG. 11 is a flowchart illustrating processing steps where a shooting mode is changed during moving image shooting in the third exemplary embodiment.

First, a configuration of the image pickup apparatus of the present exemplary embodiment will be described with reference to FIG. 10. In FIG. 10, a subject optical image entered through a lens 300 is photoelectrically converted by a CCD 301 into an electric signal. On the basis of a drive control signal input from a timing generator 307, the CCD 301 captures the subject optical image for a predetermined period of time. At the same time, the CCD 301 sends an image signal having been converted into an electric signal to an analog signal processor 302 according to a read control signal input from the timing generator 307.

The timing generator 307 generates a drive control signal and a read control signal on the basis of a control signal input from a timing controller 308. The analog signal processor 302 primarily includes an LPF circuit and an AGC circuit. The analog signal processor 302 performs noise reduction and signal level adjustment on the image signal output from the CCD 301.

An A/D conversion processor 303 converts the image signal output from the analog signal processor 302 to a digital signal (hereinafter referred to as "image data"). A digital signal processor 304 primarily includes a WB circuit and a γ-correction circuit. The WB circuit converts the level of each color component of the image data output from the A/D conversion processor 303 and adjusts the white balance of the captured image. The γ-correction circuit uses a preset correction table to adjust the level of each pixel data and corrects the γ-characteristics of the image data.

The image data output from the digital signal processor 304 is sent to a resolution changing unit 325. According to a control signal from a CPU 323, the resolution changing unit 325 changes the resolution of the image data to be recorded. The image data output from the resolution changing unit 325 passes through a memory I/F 305 and is temporarily stored in a VRAM 306.

A compression unit 309 reads the image data stored in the VRAM 306 and compresses the read image data. The compressed image data passes through the memory I/F 305 and is recorded in a recording medium 326.

An image pickup operation unit 322 includes a moving-image-shooting start button for starting moving-image shooting operation, a moving-image-shooting end button for ending moving-image shooting operation, and a super-resolution mode button. When the super-resolution mode button is pressed, a control signal is input through the CPU 323 to a header writing unit 324 and to the resolution changing unit 325. On the basis of the control signal from the CPU 323, the header writing unit 324 writes, to a header of each frame, information about whether shooting is to be performed in a super-resolution mode or in a normal mode.

Next, processing steps performed during moving image shooting in the image pickup apparatus of the present exemplary embodiment will be described with reference to the flowchart of FIG. 11. FIG. 11 illustrates processing steps from the point at which the moving-image-shooting start button of the image pickup operation unit 322 in FIG. 10 is pressed.

Referring to FIG. 11, at the start of moving-image shooting operation, "mode" is reset to 0 in step S006. Then, the process proceeds to step S000 where it is determined whether the super-resolution mode button has been pressed in the image pickup operation unit 322. If it is determined that the super-resolution mode button has not been pressed, the process proceeds to step S004.

On the other hand, if it is determined in step S000 that the super-resolution mode button has been pressed, the process proceeds to step S001 where it is determined whether the current shooting mode is the normal mode. In the present exemplary embodiment, mode=0 is set for the normal mode and mode=1 is set for the super-resolution mode.

If it is determined in step S001 that the current shooting mode is the normal mode (i.e., mode=0), the process proceeds to step S003 where 1 is substituted into "mode" to raise the resolution of image data. For example, the resolution is raised to video graphics array (VGA) resolution (640×480 pixels).

On the other hand, if it is determined in step S001 that the current shooting mode is the super-resolution mode (i.e., mode=1), the process proceeds to step S002 where 0 is substituted into "mode" to lower the resolution of image data. For example, the resolution is lowered to quarter video graphics array (QVGA) resolution (320×240 pixels).

Next, the process proceeds to step S004 where shooting mode information, such as mode=0 for the normal mode or mode=1 for the super-resolution mode, is written to the header of each frame. Then, the process proceeds to step S005 where it is determined whether the moving-image-shooting end button has been pressed in the image pickup operation unit 322. If it is determined in step S005 that the moving-image-shooting end button has not been pressed, the process returns to step S000. If it is determined in step S005 that the moving-image-shooting end button has been pressed, the shooting operation ends.

By performing the processing steps described above, the resolution of image data to be recorded can be changed by pressing the super-resolution mode button during moving image shooting. In the normal mode, image data can be recorded at low resolution, such as QVGA resolution, while in the super-resolution mode, image data can be recorded at high resolution, such as VGA resolution.

Moreover, since shooting mode information is written to the header of each frame, a scene taken in the normal mode and a scene taken in the super-resolution mode are easily distinguishable from each other in moving image reproduction.

Fourth Exemplary Embodiment

Figure 2:
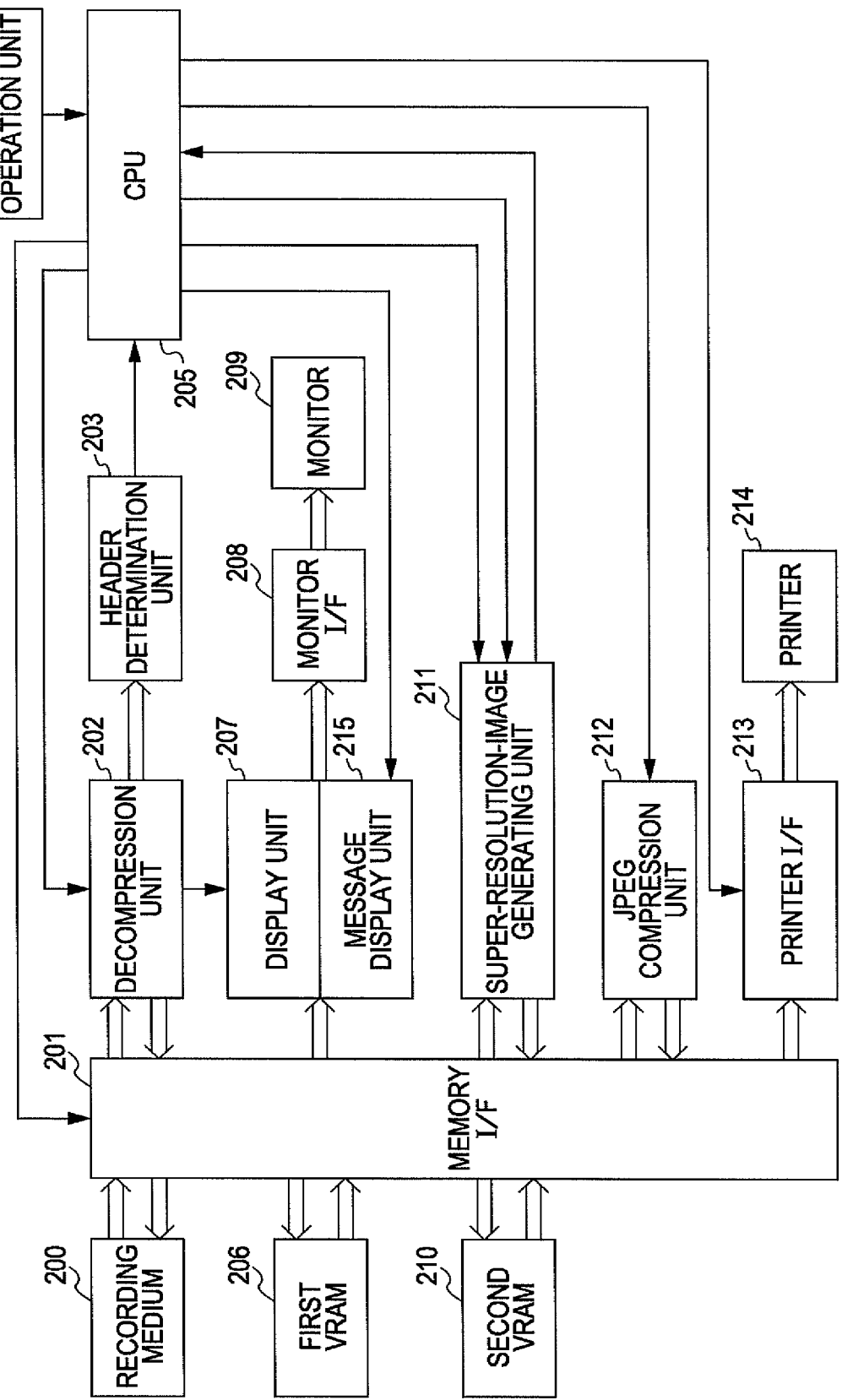
FIG. 2 is a block diagram illustrating a configuration of a reproducing apparatus according to a fourth exemplary embodiment of the present invention.
Figure 6:
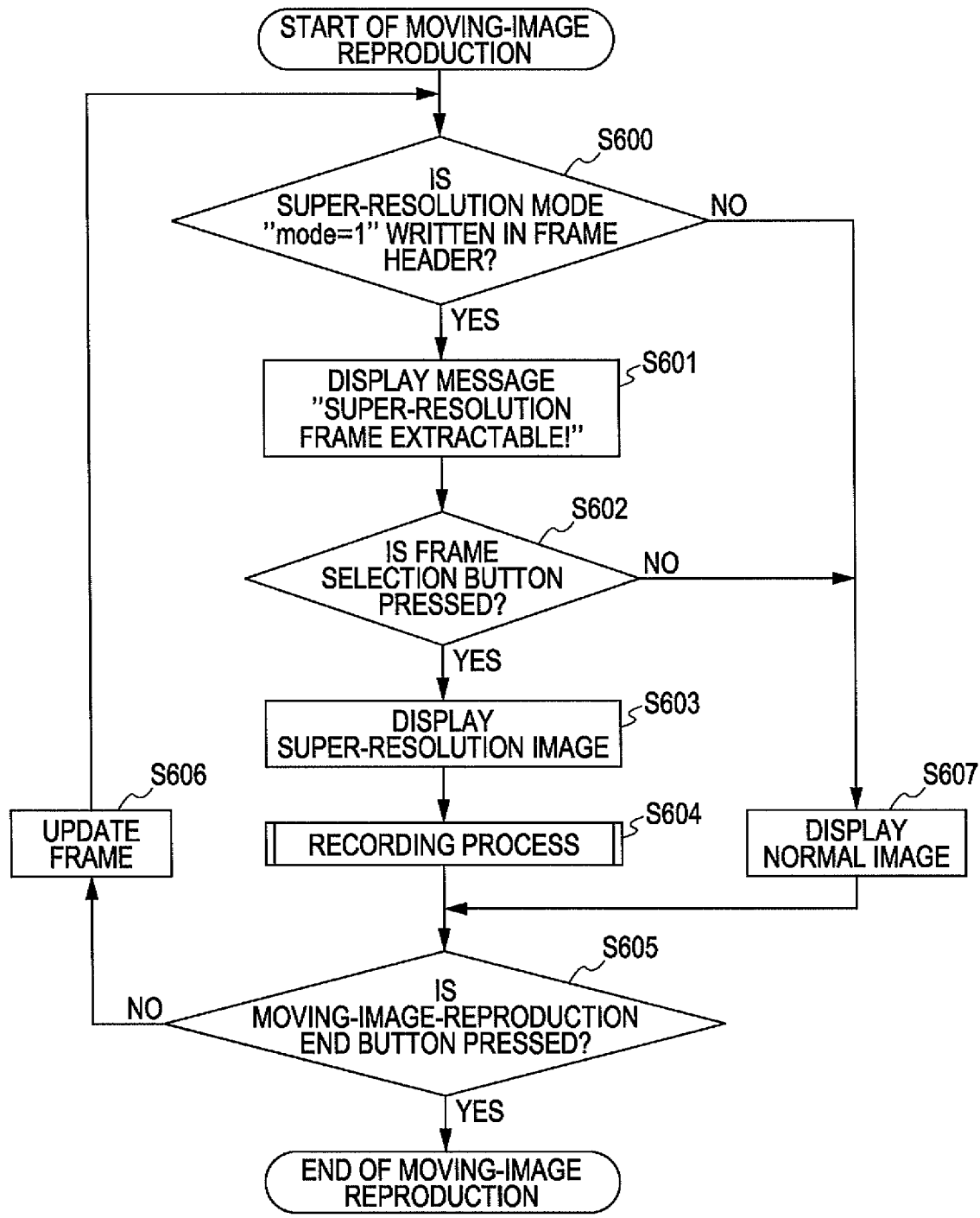
FIG. 6 is a flowchart illustrating processing steps in a CPU of the reproducing apparatus according to the fourth exemplary embodiment of the present invention.

FIG. 2 is a block diagram according to a fourth exemplary embodiment of the present invention, and illustrates an exemplary configuration of a reproducing apparatus capable of extracting super-resolution frame image data from a scene selected during moving image reproduction. FIG. 6 is a flowchart illustrating processing steps for extracting super-resolution frame image data from a scene selected during moving image reproduction.

First, a configuration of the reproducing apparatus of the present exemplary embodiment will be described with reference to FIG. 2. Moving image data compressed by any one of the above-described image pickup apparatuses is recorded in a recording medium 200. A decompression unit 202 reads the compressed moving image data from the recording medium 200 through a memory I/F 201 and decompresses the read data. Then, the decompression unit 202 outputs header information written in the header of each frame to a header determination unit 203.

The header determination unit 203 determines whether the shooting mode is the normal mode or the super-resolution mode, and outputs a control signal through a CPU 205 to the decompression unit 202 and to a super-resolution-image generating unit 211. According to the control signal from the CPU 205, the decompression unit 202 changes the decompression method depending on whether the shooting mode is the normal mode or the super-resolution mode.

Image data decompressed by the decompression unit 202 is output through the memory I/F 201 to a first VRAM 206 and temporarily stored in the first VRAM 206. A display unit 207 reads the image data from the first VRAM 206 through the memory I/F 201, combines the image data with a synchronizing signal generated by a synchronizing signal generator (SSG) in the display unit 207, and generates a video-out signal. The generated video-out signal is sent through a monitor I/F 208 to a monitor 209 and displayed as a moving image.

If the shooting mode information written in the header is the super-resolution mode, a control signal for starting the reading of image data from the first VRAM 206 is input to the super-resolution-image generating unit 211.

At the same time, a message display unit 215 displays a message on the monitor 209 to indicate that a super-resolution frame image can be extracted. A reproducing operation unit 204 includes a moving-image-reproduction start button, a moving-image-reproduction end button, a frame selection button, a record button, and a cancel button. When the frame selection button is pressed, a control signal for starting super-resolution-image generation is input through the CPU 205 to the super-resolution-image generating unit 211. According to the control signal, the super-resolution-image generating unit 211 generates a super-resolution image of a selected frame image on the basis of a plurality of pieces of temporally sequential image data.

The super-resolution-image generating unit 211 of the present exemplary embodiment restores high-frequency components of the selected frame image by using displacements caused by motion blurring that occurs when taking pictures with a camera, and using a plurality of temporally sequential frame images with small inter-frame displacements.

To read several consecutive frame images preceding and following the selected frame image, the super-resolution-image generating unit 211 returns header information for the selected frame image back to the CPU 205. Upon receipt of the header information, the CPU 205 outputs a control signal to the decompression unit 202 so that temporally sequential frame images are read from the recording medium 200 and decompressed.

The decompressed frame images are sent through the memory I/F 201 to the super-resolution-image generating unit 211. On the basis of the selected frame image, the super-resolution-image generating unit 211 estimates the displacements of the temporally sequential frame images. The super-resolution-image generating unit 211 generates a super-resolution image by determining a weighted sum using weights corresponding to the respective estimated displacements.

The generated super-resolution image is sent through the memory I/F 201 to a second VRAM 210 and temporarily stored in the second VRAM 210. When the frame selection button in the reproducing operation unit 204 is pressed, the display unit 207 switches to reading image data from the second VRAM 210 through the memory I/F 201 according to a control signal input from the CPU 205. Thus, when the frame selection button in the reproducing operation unit 204 is pressed, the monitor 209 displays the super-resolution image generated by the super-resolution-image generating unit 211.

At the same time, according to a control signal from the CPU 205, the monitor 209 displays a message asking whether the displayed super-resolution image is to be recorded, and prompts the user to press the record button or cancel button in the reproducing operation unit 204.

If the cancel button is pressed in the reproducing operation unit 204, the frame image is updated and displayed in the display unit 207 while the super-resolution image is not recorded. If the record button is pressed in the reproducing operation unit 204, a control signal for starting compression is input through the CPU 205 to a JPEG compression unit 212.

According to the control signal from the CPU 205, the JPEG compression unit 212 reads the super-resolution image data from the second VRAM 210 through the memory I/F 201. The read super-resolution image data is compressed in JPEG format, sent through the memory I/F 201, and recorded in the recording medium 200.

Next, processing steps performed during moving image reproduction in the reproducing apparatus of the present exemplary embodiment will be described with reference to the flowchart of FIG. 6. FIG. 6 illustrates processing steps from the point at which the moving-image-reproduction start button is pressed and the moving image reproduction is started.

Referring to FIG. 6, in step S600, it is determined which of the "normal mode" and "super-resolution mode" is written in the frame header of a moving image recorded by any one of the image pickup apparatuses described above. If it is determined that the normal mode is written, the process proceeds to step S607 where image data is read from the first VRAM 206 and a normal image is displayed on the monitor 209.

On the other hand, if it is determined in step S600 that the super-resolution mode is selected as the shooting mode, the process proceeds to step S601 where a message "super-resolution frame extractable!" is displayed on the monitor 209.

Then, the process proceeds to step S602 where it is determined whether the frame selection button has been pressed in the reproducing operation unit 204. If it is determined in step S602 that the frame selection button has not been pressed, the process proceeds to step S607 where image data is read from the first VRAM 206 and a normal image is displayed on the monitor 209.

On the other hand, if it is determined in step S602 that the frame selection button has been pressed, the process proceeds to step S603 where a super-resolution image of the selected frame is generated, image data is read from the second VRAM 210 in which the generated super-resolution image is stored, and thus the super-resolution image is displayed on the monitor 209. Next, the process proceeds to step S604 where recording is performed. The recording is described in detail below with reference to FIG. 7.

Next, in step S605, it is determined whether the moving-image-reproduction end button has been pressed. If it is determined that the moving-image-reproduction end button has not been pressed, the frame is updated in step S606 and the process returns to step S600. If it is determined in step S605 that the moving-image-reproduction end button has been pressed, the moving image reproduction ends.

Figure 7:
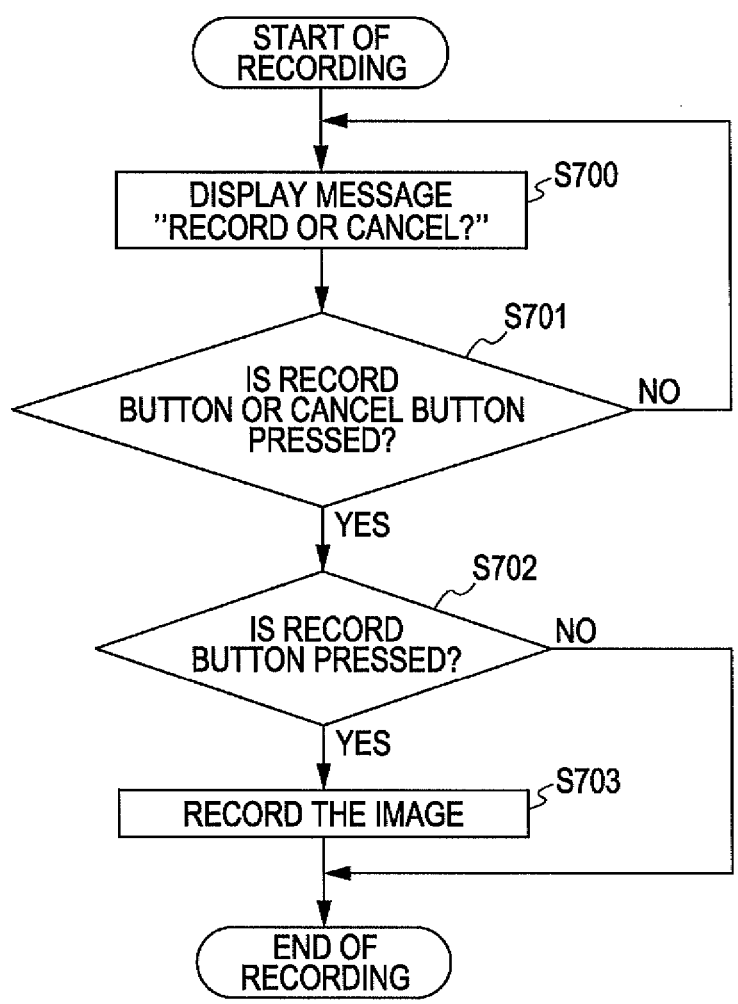
FIG. 7 is a flowchart illustrating processing steps in the CPU for a recording process of FIG. 6.

FIG. 7 is a flowchart illustrating details of the recording performed in step S604 of FIG. 6. In step S700 of FIG. 7, the monitor 209 displays a message "record or cancel?" to prompt the user to press the record button or cancel button in the reproducing operation unit 204.

The process proceeds to step S701 where it is determined whether the user has pressed either the record button or cancel button in the reproducing operation unit 204. If it is determined that neither the record button nor the cancel button has been pressed, the process returns to step S700.

If it is determined in step S701 that one of the record button and the cancel button has been pressed, the process proceeds to step S702 where it is determined whether the record button has been pressed. If it is determined that the record button has not been pressed, the recording process ends. If it is determined in step S702 that the record button has been pressed, the process proceeds to step S703 where super-resolution image data is compressed in JPEG format and recorded in the recording medium 200. Then, the recording process ends.

By performing the processing steps described above, when the user selects a frame from those captured during the period of super-resolution mode in a recorded moving image, super-resolution image data can be generated and recorded on the basis of consecutive pieces of image data preceding and following the selected frame.

In the reproducing apparatus of the present exemplary embodiment, extracted super-resolution image data is compressed in JPEG format and recorded in the recording medium 200. Extracted super-resolution image data can also be used in other ways for various purposes. For example, as illustrated in FIG. 2, super-resolution image data can be read from the second VRAM 210, sent through a printer I/F 213 to a printer 214, and printed.

Moreover, in the present exemplary embodiment described above, a determination as to whether a super-resolution image can be generated is made on the basis of the shooting mode information written in the header. The header determination unit 203 can make a similar determination when information about a compression ratio or resolution is written in the header.

Fifth Exemplary Embodiment

In a fifth exemplary embodiment of the present invention, for shooting a still image during moving image shooting, the shooting mode is changed to the super-resolution mode by pressing a still-image-shooting button. In the super-resolution mode, images are recorded at a lower compression ratio for a time period (corresponding to several frames) appropriate for generating super-resolution images. Then, the shooting mode automatically returns to the moving-image-shooting mode (normal mode) where the compression ratio is raised and moving image recording continues. In the present exemplary embodiment, a configuration of an image pickup apparatus capable of changing a compression ratio during moving image shooting is the same as that illustrated by the block diagram of FIG. 1.

Figure 12:
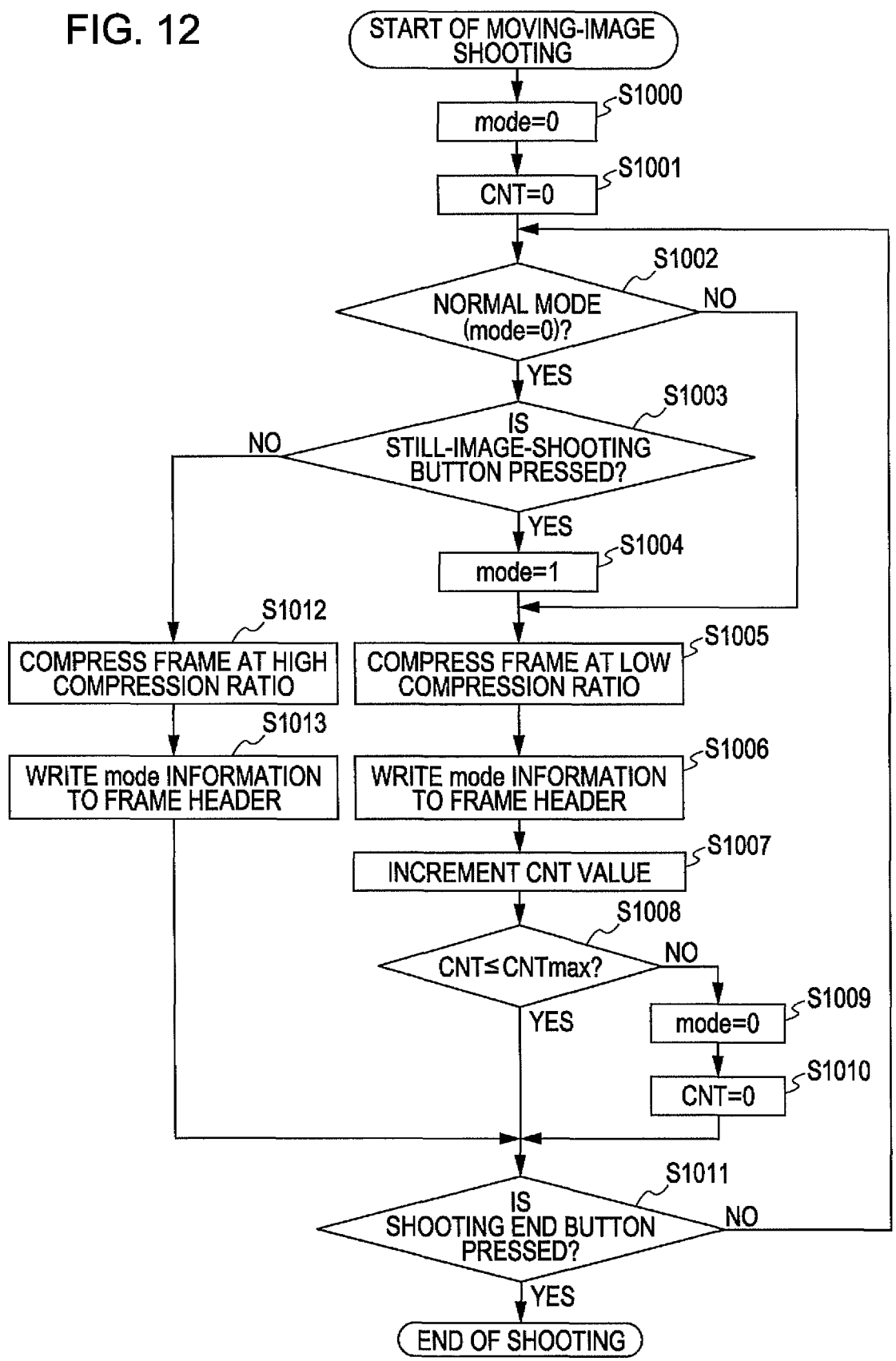
FIG. 12 is a flowchart illustrating processing steps in a CPU of an image pickup apparatus according to a fifth exemplary embodiment of the present invention.

Processing steps in which the shooting mode is changed during moving image shooting will be described with reference to FIG. 12. FIG. 12 illustrates processing steps from the point at which the moving-image-shooting start button of the image pickup operation unit 822 in FIG. 1 is pressed.

Referring to FIG. 12, at the start of moving-image shooting operation, "mode" is reset to 0 in step S1000 and CNT is reset to 0 in the next step S1001. Then, the process proceeds to step S1002 where it is determined whether the shooting mode is the normal mode. In the present exemplary embodiment, mode=0 is set for the normal mode and mode=1 is set for the super-resolution mode.

If it is determined in step S1002 that the current shooting mode is the normal mode (i.e., mode=0), the process proceeds to step S1003. If it is determined in step S1002 that the current shooting mode is the super-resolution mode (i.e., mode=1), the process proceeds to step S1005.

In step S1003, it is determined whether the still-image-shooting button (super-resolution mode button) has been pressed in the image pickup operation unit 822.

If it is determined in step S1003 that the super-resolution mode button has not been pressed, the process proceeds to step S1012. In step S1012, the compression ratio is changed such that frame image data is compressed at a high compression ratio. Then, the process proceeds to step S1013 where "mode" is written to the header of each frame. The process then proceeds to step S1011.

On the other hand, if it is determined in step S1003 that the super-resolution mode button has been pressed, the process proceeds to step S1004 where 1 is substituted into "mode". Then, the process proceeds to step S1005.

In step S1005, the compression ratio is changed such that frame image data is compressed at a low compression ratio. Then, the process proceeds to step S1006 where "mode" is written to the header of each frame.

Next, in step S1007, the current CNT value is incremented by 1.

Then, in step S1008, the CNT value is compared to CNTmax. If the CNT value is equal to or less than CNTmax (i.e., CNT≦CNTmax), the process proceeds to step S1011. If the CNT value is larger than CNTmax (i.e., CNT>CNTmax), the process proceeds to step S1009.

Here, the number of frames necessary for providing super-resolution is entered in advance as a value for CNTmax. For example, if 3 is entered as the CNTmax value (i.e., CNTmax=3), four frame images from the point at which the stillimage-shooting button is pressed are compressed at a low compression ratio and recorded.

In step S1008, if the CNT value is larger than CNTmax (i.e., CNT>CNTmax), the process proceeds to step S1009 where 0 is substituted into "mode". In step S1010, 0 is substituted into CNT.

Then, the process proceeds to step S1011 where it is determined whether the moving-image-shooting end button has been pressed in the image pickup operation unit 822. If it is determined that the moving-image-shooting end button has not been pressed, the process returns to step S1002 to repeat the steps described above. If it is determined in step S1011 that the moving-image-shooting end button has been pressed, the shooting operation ends.

As described above, since the number of frames is entered as a CNTmax value in advance, the user is required only to press the still-image-shooting button (super-resolution mode button) once during moving image shooting. In other words, by pressing the still-image-shooting button once, image data can be recorded at a low compression ratio only for the time period required to generate a super-resolution image, and then, the shooting mode automatically returns to the moving-image-shooting mode (normal mode), which allows moving image recording at a higher compression ratio to be resumed.

Sixth Exemplary Embodiment

A sixth exemplary embodiment of the present invention is characterized by an image-data recording method for allowing the start of high-quality recording of images obtained before the shooting mode is changed to the super-resolution mode. In the present exemplary embodiment, a configuration of an image pickup apparatus capable of changing a compression ratio during moving image shooting is the same as that illustrated by the block diagram of FIG. 1.

Figure 13:
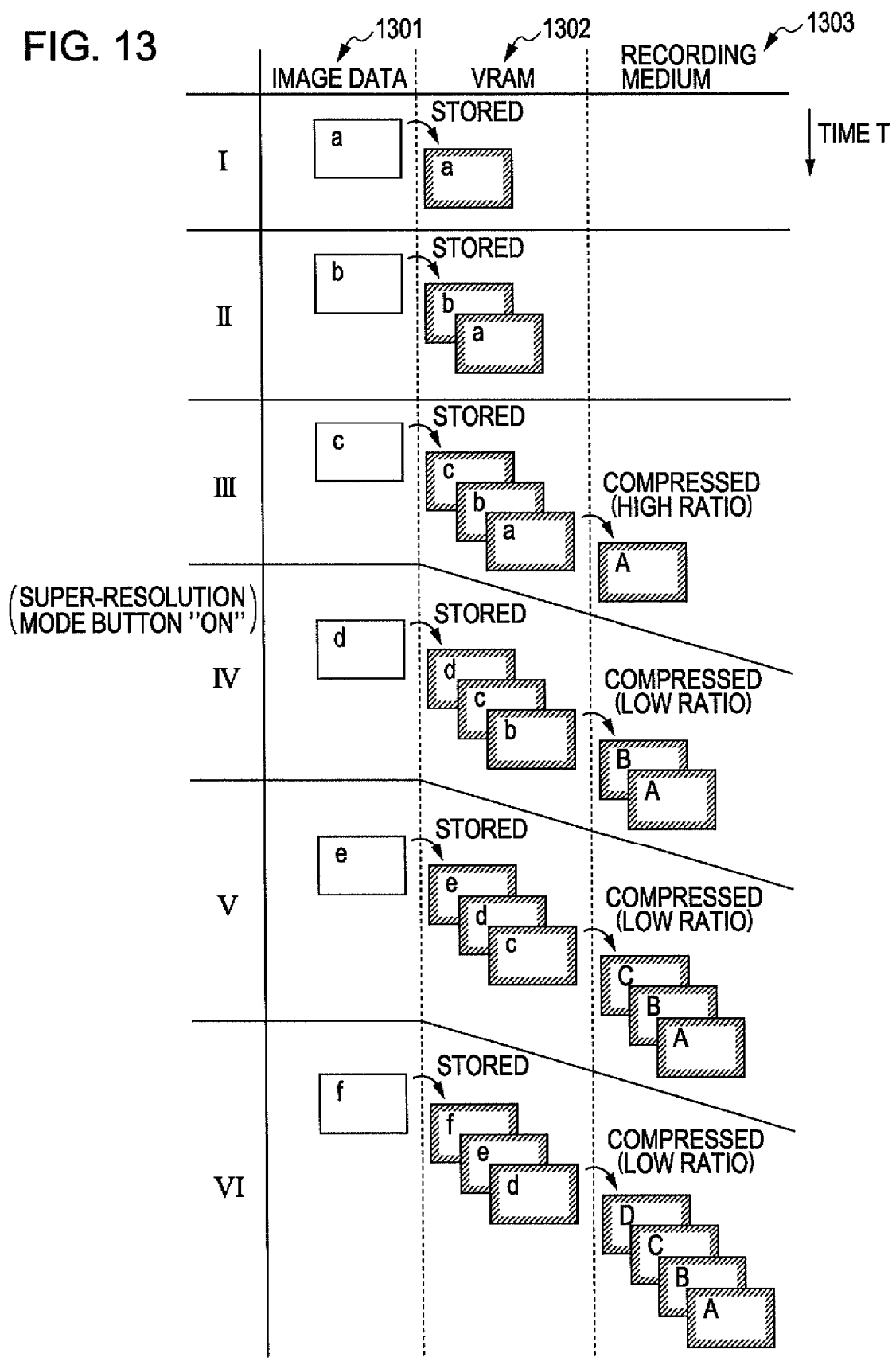
FIG. 13 illustrates an image-data recording method according to a sixth exemplary embodiment of the present invention.

FIG. 13 illustrates an image-data recording method according to the sixth exemplary embodiment. Referring to FIG. 13, "image data" 1301 shows image data obtained by shooting a subject and developed. "VRAM" 1302 shows image data stored in the VRAM 806 of FIG. 1. In the present embodiment, a plurality of pieces of developed image data can be stored in the VRAM 806. "Recording medium" 1303 shows image data recorded in the recording medium 826. In FIG. 13, Roman numerals I through VI are assigned to respective time phases in sequential order.

The recording method of the present exemplary embodiment will be described with reference to FIG. 13. In phase I, developed image data (a) is stored in the VRAM 806. Next, in phase II, developed image data (b) is stored in a VRAM area different from that of image data (a).

Likewise, in phase III, developed image data (c) is stored in a VRAM area different from those of image data (a) and (b). Here, image data (a) initially stored in the VRAM 806 is converted to compressed image data (A) compressed at a high compression ratio and recorded in the recording medium 826. In the normal mode, that is, during moving image recording, the above-described steps are repeated to record moving image data in the recording medium 826.

Next, in phase IV of FIG. 13, the super-resolution mode button is pressed. This changes the shooting mode to the super-resolution mode.

Developed mage data (d) is stored in a VRAM area different from those of image data (b) and (c). Since image data (a) has already been read out of the VRAM 806, image data (d) is stored in the VRAM area in which image data (a) was previously stored. This can contribute to the reduced size of the VRAM 806.

In the super-resolution mode, previously stored image data (b) is read out of the VRAM 806, converted to compressed image data (B) compressed at a low compression ratio, and recorded in the recording medium 826.

Next, in phase V of FIG. 13, developed image data (e) is stored in a VRAM area different from those of image data (c) and (d). Since image data (b) has already been read out of the VRAM 806, image data (e) is stored in the VRAM area in which image data (b) was previously stored.

Then, previously stored image data (c) is read out of the VRAM 806, converted to compressed image data (C) compressed at a low compression ratio, and recorded in the recording medium 826.

Likewise, in phase VI of FIG. 13, developed image data (f) is stored in a VRAM area different from those of image data (d) and (e). Since image data (c) has already been read out of the VRAM 806, image data (f) is stored in the VRAM area in which image data (c) was previously stored.

Then, previously stored image data (d) is read out of the VRAM 806, converted to compressed image data (D) compressed at a low compression ratio, and recorded in the recording medium 826.

Thus, repeating the above-described steps allows the start of high-quality recording of images obtained before the user changes the shooting mode to the super-resolution mode. Then, for displaying super-resolution image data during reproduction, the super-resolution image data can be generated by using image data obtained before and after the time specified by the user.

Figure 14:
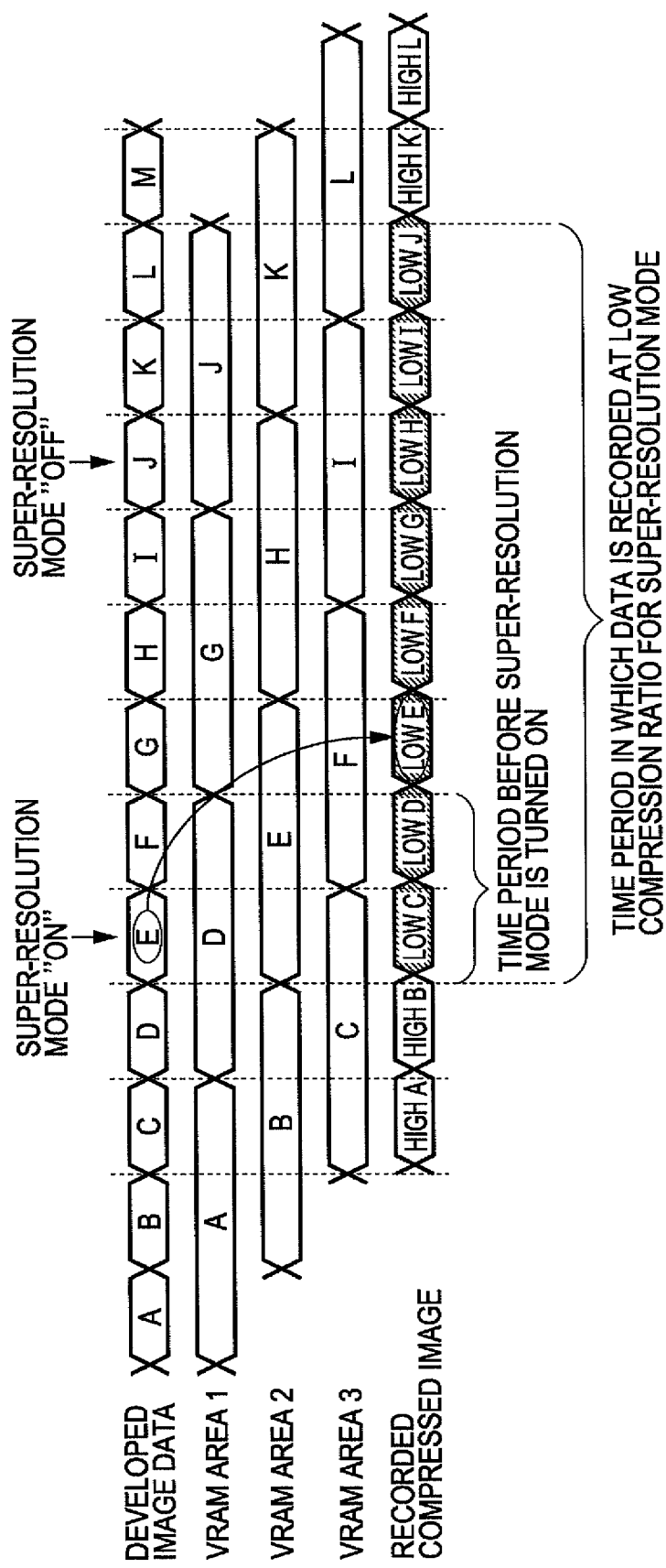
FIG. 14 is a timing chart illustrating operation when the image-data recording method of the sixth exemplary embodiment is used.
Figure 15:
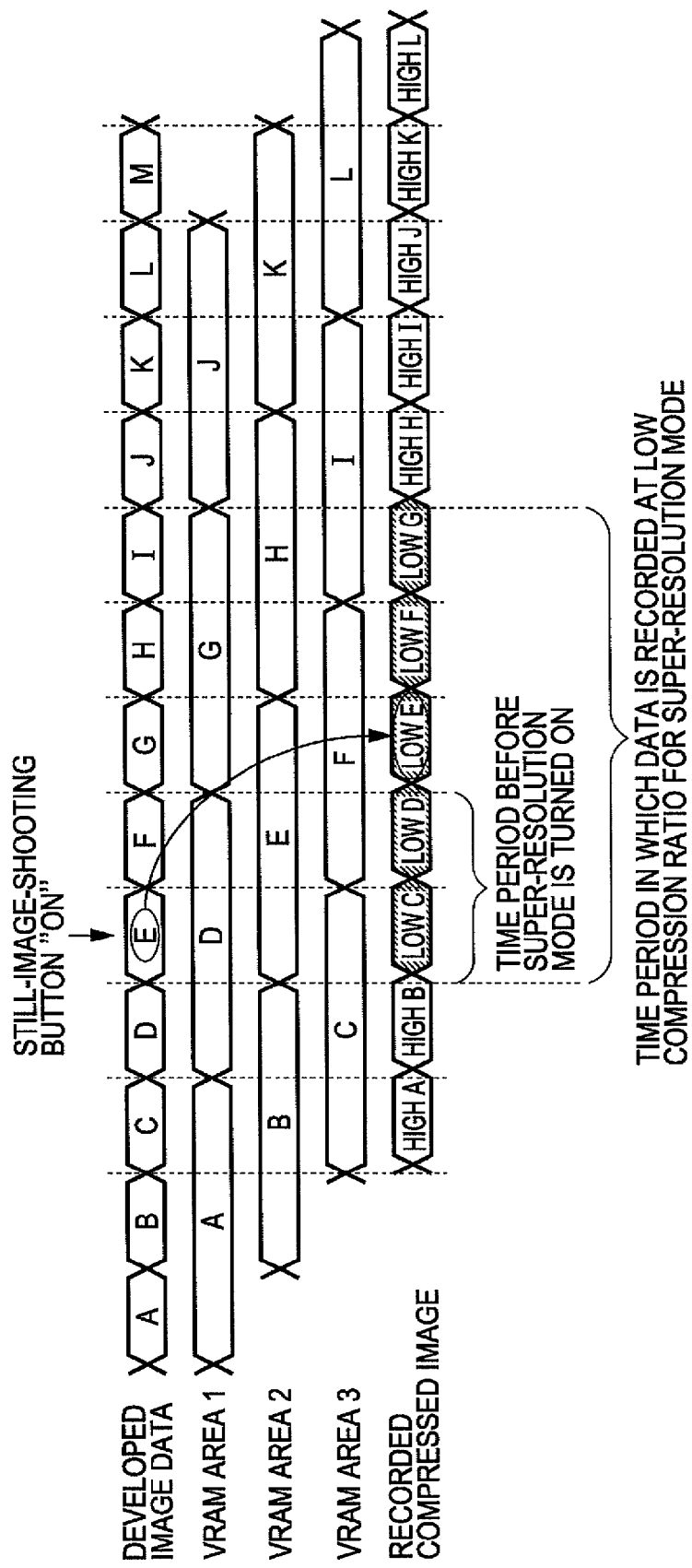
FIG. 15 is another timing chart illustrating operation when the image-data recording method of the sixth exemplary embodiment is used.

FIG. 14 is a timing chart of blocks involved in compression processing when the method of the present exemplary embodiment is applied to the processing steps illustrated by the flowcharts of FIG. 5, FIG. 9 and FIG. 11. FIG. 15 is a timing chart of blocks involved in compression processing when the method of the present exemplary embodiment is applied to the processing steps illustrated by the flowchart of FIG. 12.

As is obvious from FIG. 14 and FIG. 15, images corresponding to image data C and D preceding image data E obtained at the time when a button is pressed can be recorded at a low compression ratio.

Seventh Exemplary Embodiment

A seventh exemplary embodiment of the present invention refers to super-resolution processing applicable to the first through sixth exemplary embodiments.

Figure 16:
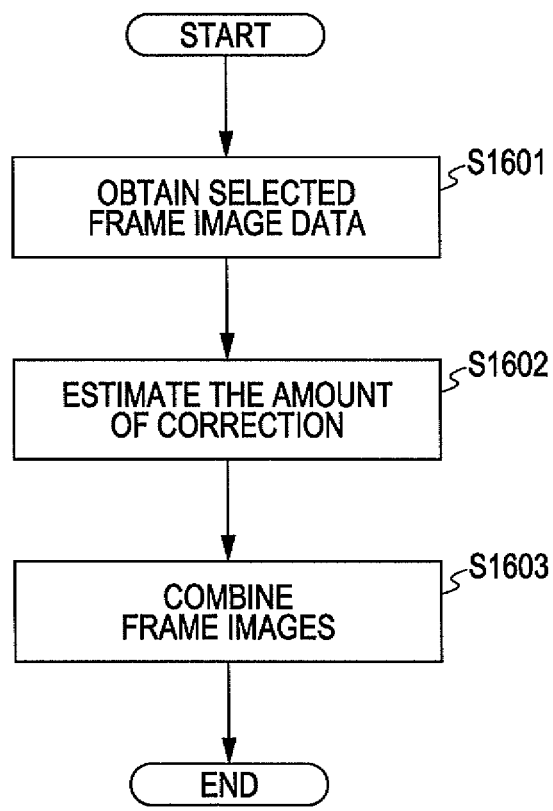
FIG. 16 is a flowchart illustrating steps of super-resolution processing applied to at least one exemplary embodiment of the present invention.

FIG. 16 is a flowchart illustrating steps of super-resolution processing. In step S1601, a plurality of pieces of selected frame image data are obtained. For example, in the present exemplary embodiment, four pieces of selected frame image data are obtained. The plurality of pieces of obtained frame image data are temporarily stored in a memory.

Frame image data includes gradation data (hereinafter also referred to as "pixel data") representing a gradation value (hereinafter also referred to as "pixel value") of each pixel in a dot matrix. Pixel data is, for example, YCbCr data containing luminance (Y), blue chrominance (Cb), and red chrominance (Cr) components, or RGB data containing read (R), green (G), and blue (B) components. The type of pixel data depends on the type of the image pickup device.

For clear description of the super-resolution processing, frame image data of the present exemplary embodiment is represented by multilevel image data of only a single color. The image is not of VGA size, but is represented by 8×8=64 pixels as will be described with reference to FIG. 17.

In step S1602, the amount of correction for correcting displacements (positional displacements) of the frames of three obtained frame images is estimated. For the estimation of the amount of correction, one of the above-described four selected frame images is set as a reference frame, and the other three frame images are set as target frames. Then, with respect to each target frame, the amount of correction for correcting the displacement from the reference frame is estimated. In the present exemplary embodiment, the frame image generated earliest of the four selected frame images is set as a reference frame, and the other three frame images are set as target frames.

In the following description, a number (hereinafter also referred to as "frame number") for each of the obtained four frames is represented by "n" (n=0, 1, 2, or 3). A frame with a frame number "n" is referred to as "frame n", and an image corresponding to frame n is referred to as "frame image Fn". For example, a frame with a frame number n=0 is referred to as "frame 0" and its corresponding image is referred to as "frame image F0". Here, frame 0 is set as a reference frame, and frames 1 through 3 are set as target frames. At the same time, frame image F0 corresponding to the reference frame is also referred to as a reference frame image, and frame images F1 through F3 corresponding to the respective target frames are also referred to as target frame images.

The displacements of images are represented by the combination of translational (lateral or vertical) and rotational displacements. Here, the description about rotational displacements and processing performed for the rotational displacements will be omitted in the present exemplary embodiment.

Figure 17:
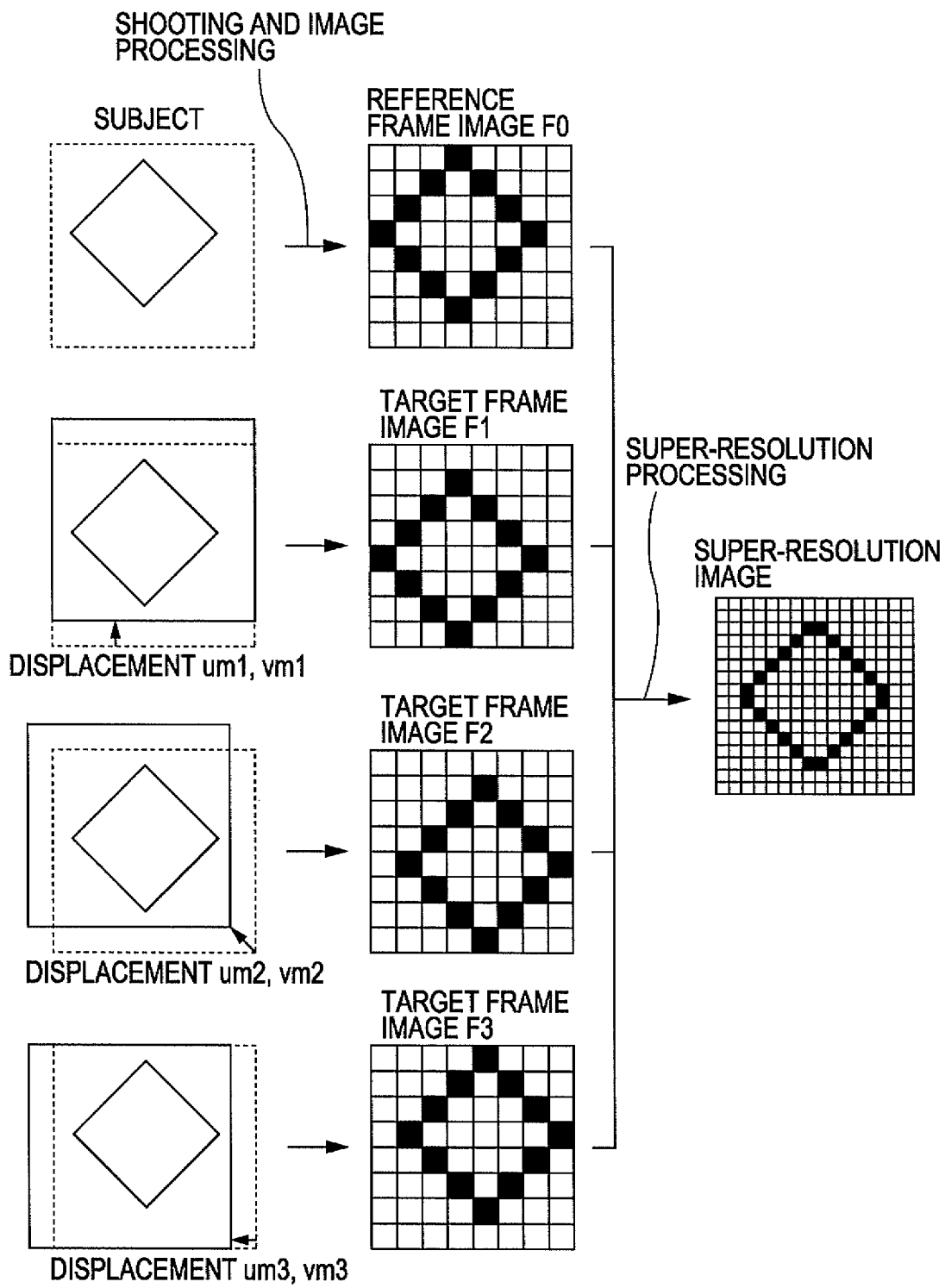
FIG. 17 illustrates frame images used in super-resolution processing and an image obtained after the super-resolution processing.

FIG. 17 illustrates frame images used in super-resolution processing and an image obtained by the super-resolution processing. FIG. 17 illustrates a subject, and reference frame image F0 and target frame images F1 through F3 obtained by shooting. A dotted-line rectangle around the subject represents a field angle when reference frame image F0 is taken, while a solid-line rectangle represents a field angle when each of target frame images F1 through F3 is taken.

In the present exemplary embodiment, the amount of lateral translational displacement is represented by "um", while the amount vertical translational displacement is represented by "vm". The amount of lateral translational displacement of target frame image Fn (n=1 through 3) is represented by "umn", while the amount of vertical translational displacement of target frame image Fn (n=1 through 3) is represented by "vmn". For example, as illustrated in FIG. 17, the amount of vertical translational displacement of target frame image F1 with respect to reference frame image F0 is represented by um1 and vm1.

To combine target frame images (F1 through F3) with reference frame image (F0), the displacement of each pixel in each target frame image is corrected such that the displacement between each target frame image and the reference frame image is eliminated. The amount of lateral translational correction and the amount of vertical translational correction that are to be used for this correction are represented by "u" and "v", respectively. The amount of lateral translational correction for target frame image Fn (n=1 through 3) is represented by "un", while the amount of vertical translational correction for target frame image Fn (n=1 through 3) is represented by "vn". For example, the amount of correction for target frame image F1 is represented by u1 and v1.

Here, the term correction means to move the position of each pixel in target frame image Fn (n=1 through 3) by "un" in the lateral direction and "vn" in the vertical direction. Therefore, the amounts of correction "un" and "vn" for target frame image Fn (n=1 through 3) can be expressed as un=−umn and vn=−vmn, respectively. For example, the amounts of correction u1 and v1 for target frame image F1 can be expressed as u1=−um1 and v1=−vm1, respectively.

Thus, by correcting the position of each pixel in target frame image F1 using the amounts of correction u1 and v1, the displacement between target frame image F1 and reference frame image F0 can be eliminated. Correction for target frame images F2 and F3 can be made in the same manner by using the amounts of correction u2 and v2 and the amounts of correction u3 and v3.

The amounts of correction "un" and "vn" for each target frame image Fn (F1 through F3) are calculated on the basis of image data for reference frame image F0 and image data for each of target frame images F1 through F3. For the calculation, predetermined formulas for a pattern matching method, a gradient method, a least-squares method, or the like are used. The calculated amounts of correction "un" and "vn" are stored as data for the amounts of translational correction "un" and "vn" in a predetermined area of the memory.

In step S1603, image data for the reference frame is combined with image data for the corrected target frames to generate high-resolution still image data.

In the present exemplary embodiment, FIG. 17 illustrates the displacement of each target frame on a pixel-by-pixel basis, for the purposes of clarification. However, a displacement of less than one pixel length occurs in actual shooting. Using such a small displacement allows the achievement of higher resolution.

Therefore, of pixels (hereinafter also referred to as "generated pixels") constituting a still image to be generated, some pixels do not exist either in the reference frame image or in the target frame images.

For such pixels, interpolation is performed by a predetermined method using pixel data (i.e., gradation data representing gradation values) representing pixel values of pixels around the generated pixels. Thus, a plurality of pixels combine together to form a higher-resolution image. Exemplary interpolation methods include a bilinear method, a bicubic method, and a nearest neighbor method.

FIG. 18 illustrates interpolation using the bilinear method. As illustrated, first, a frame image having a nearest neighbor pixel 1802 located at the shortest distance from a generated pixel 1801 is selected from a reference frame image and target frame images. Next, in the selected frame image, four pixels around the generated pixel 1801 are determined to be neighbor pixels 1802 through 1805. Then, values obtained by assigning predetermined weights to respective data values for the neighbor pixels 1802 through 1805 are averaged to produce a data value for the generated pixel 1801.

By performing the above-described steps with respect to each location of generated pixels, a super-resolution image with resolution, for example, twice as high as that of the frame images can be obtained, as illustrated in FIG. 17. The resolution does not have to be twice as high as that of the frame images, but can be some other multiple of that of the frame images. The more the number of frames containing data values used in interpolation, the higher the definition of the super-resolution image.

Other Exemplary Embodiments

Each component of the image pickup apparatus and each step of the image pickup method according to the above-described exemplary embodiments of the present invention can be implemented by executing a program stored, for example, in a RAM or a read-only memory (ROM) of a computer. The program and a computer-readable recording medium in which the program is recorded are included in the scope of the present invention.

The present invention may be embodied, for example, as a system, an apparatus, a method, a program, or a storage medium. Specifically, the present invention may either be applied to a system formed of a plurality of units, or to an apparatus formed of a single unit.

The present invention includes a case where a software program (e.g., a program corresponding to the flowchart of any one of FIGS. 5, 6, 7, 9, 11, and 12 according to the exemplary embodiments) that performs the functions of the above-described exemplary embodiments is supplied directly to a system or apparatus. The present invention also includes a case where such a program is supplied from a remote device to a system or apparatus, and a computer of the system or apparatus reads and executes the supplied program code to perform the functions of the above-described exemplary embodiments.

Therefore, the program code installed in the computer for performing the functional processing of the present invention also implements the present invention. In other words, the computer program for performing the functional processing of the present invention is also included in the present invention.

In this case, the program may take any form as long as it serves as the program. Examples of possible forms of the program include object code, a program executed by an interpreter, and script data supplied to an operating system (OS).

Examples of a recording medium for supplying the program include a floppy disk, a hard disk, an optical disk, a magneto-optical (MO) disk, a compact-disk read-only memory (CD-ROM), a CD-recordable (CD-R), a CD-rewritable (CD-RW), a magnetic tape, a nonvolatile memory card, a ROM, and a digital versatile disk (DVD) (e.g. DVD-ROM or DVD-R).

Another possible method of supplying the program is to download the computer program of the present invention from homepages on the Internet by accessing the homepages through a browser on a client computer. The computer program of the present invention can also be supplied by downloading a file created by compressing the program and provided with an automatic installation function into a recording medium, such as a hard disk.

In another possible supplying method, program code included in the program of the present invention is divided into a plurality of files, which are then downloaded from different homepages on the Internet. Therefore, a World Wide Web (WWW) server that allows a plurality of users to download program files for performing the functional processing of the present invention in computers is also included in the scope of the present invention.

In another possible method, the program of the present invention can be encrypted, stored in a storage medium, such as a CD-ROM, and distributed to users. Then, a user who meets predetermined criteria is allowed to download key information for decrypting the encrypted program from a homepage on the Internet. The user uses the key information to execute and allow the encrypted program to be installed in a computer, and thus enables the functions of the program of the present invention to be performed.

The functions of the above-described exemplary embodiments are performed when a computer reads and executes the program. Also, on the basis of instructions of the program, an OS running on a computer carries out all or part of the actual processing. This allows the functions of the above-described exemplary embodiments to be performed.

Moreover, the functions of the above-described exemplary embodiments are also performed when the program read out of a storage medium is written to a function expansion board in a computer or to a memory of a function expansion unit connected to a computer and then, on the basis of instructions of the program, the function expansion board or a CPU in the function expansion unit carries out all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-364043 filed Dec. 16, 2005, and No. 2006-314402 filed Nov. 21, 2006 which are hereby incorporated by reference herein in their entirety.

What is claimed is:

1. An image pickup apparatus comprising:
a moving image shooting unit configured to shoot a moving image;
a compression unit configured to compress a subject image in the moving image obtained from the moving image shooting unit to generate a compressed subject image;
a shooting mode changing unit configured to allow a user to change a shooting mode to a super-resolution mode in which images for a super-resolution processing generating a super resolution image using the images, which is a higher resolution image than each image, are shot, or a non-super resolution mode;
a compression ratio changing unit configured to change a compression ratio of compression by the compression ratio associated with the shooting mode, wherein the compression ratio in the super-resolution mode is lower than the compression ratio in the non-super-resolution mode; and
a recording unit configured to record the compressed subject image in a recording medium,
wherein in the super-resolution mode, the shooting mode changing unit changes the shooting mode to the non-super resolution mode automatically based on a predetermined number of images compressed at a low compression ratio being recorded by the recording unit, the predetermined number of images being set by a user so that the shooting mode is changed automatically when the predetermined number of images is reached and the predetermined number being equal to or larger than a number of images necessary to generate the super resolution image by the super resolution processing.

2. The image pickup apparatus according to claim 1, wherein in the super-resolution mode, the compression unit compresses frames to be generated by intraframe coding and compresses frames to be generated by interframe coding to generate the compressed subject image; and in the non-super resolution mode, the compression unit compresses frames to be generated by intraframe coding and compressed frames to be generated by interframe coding to generate the compressed subject image.

3. The image pickup apparatus according to claim 1, wherein in the super-resolution mode, the subject image is compressed only in compressed frames to be generated by intraframe coding; and in the non-super resolution mode, the subject image is compressed both in compressed frames to be generated by intraframe coding and compressed frames to be generated by interframe coding.

4. The image pickup apparatus according to claim 1, further comprising:
a header information writing unit configured to attach header information about the compression ratio to the compressed subject image,
wherein the recording unit records, in the recording medium, the compressed subject image to which the header information is attached.

5. The image pickup apparatus according to claim 4, further comprising:
a frame resolution changing unit configured to change frame resolution of a subject image to be recorded in the recording medium,
wherein the header information writing unit attaches header information about the frame resolution to the subject image; and
in the super-resolution mode, the frame resolution changing unit changes the frame resolution higher than that of in the non-super resolution shooting mode.

6. The image pickup apparatus according to claim 1, further comprising:
a primary storage unit configured to temporarily store a plurality of uncompressed subject images,
wherein when the shooting mode is changed to the super-resolution mode by the shooting mode changing unit, the compression unit compresses, at the lower compression ratio than that of in the non-super-resolution shooting mode, uncompressed subject images obtained before the time at which the shooting mode is changed to the super-resolution shooting mode and temporarily stored in the primary storage unit.

7. An image pickup method comprising:
shooting a moving image;
a compression step of compressing a subject image in the moving image obtained from a moving image shooting unit to generate a compressed subject image;
a shooting mode changing step of allowing a user to change from a super-resolution mode in which images for a super resolution processing generating a super resolution image using images, which is a higher resolution image than each image, are shot, or a non-super resolution mode;
a compression ratio changing step of changing a compression ratio associated with the shooting mode, wherein if the shooting mode is changed from the non-super-resolution mode to the super-resolution mode at the shooting mode changing step, the compression ratio is changed lower than that of the non-super resolution mode; and
a recording step of recording the compressed subject image in a recording medium,
wherein in the super-resolution mode, the shooting mode is changed to the non-super resolution mode automatically based on a predetermined number of images compressed at a low compression ratio being recorded, the predetermined number of images being set by a user so that the shooting mode is changed automatically when the predetermined number of images is reached and the predetermined number being equal to or larger than a number of images necessary to generate the super resolution image by the super resolution processing.

8. A non-transitory computer-readable recording medium having stored thereon computer-readable instructions for a computer to execute an image pickup method comprising:
a moving image shooting step of shooting a moving image;
a compression step of compressing a subject image in the moving image obtained from a moving image shooting unit to generate a compressed subject image;
a shooting mode changing step of allowing a user to change from a super-resolution mode in which images for a super resolution processing generating a super resolution image using the images, which is a higher resolution image than each image, are shot, or a non-super resolution mode;
a compression ratio changing step of changing a compression ratio associated with the shooting mode, wherein if the shooting mode is changed from the non-super-resolution mode to the super-resolution mode at the shooting mode changing step, the compression ratio is changed lower than that of the non-super resolution mode; and
a recording step of recording the compressed subject image in a recording medium,
wherein in the super-resolution mode, the shooting mode is changed to the non-super resolution mode automatically based on a predetermined number of images compressed at a low compression ratio being recorded, the predetermined number of images being set by a user so that the shooting mode is changed automatically when the predetermined number of images is reached and the predetermined number being equal to or larger than a number of images necessary to generate the super resolution image by the super resolution processing.

* * * * *